United States Patent
Park et al.

(10) Patent No.: US 9,854,573 B2
(45) Date of Patent: *Dec. 26, 2017

(54) RECEPTION AND CONFIGURATION OF DOWNLINK CONTROL CHANNEL

(71) Applicant: GOOGLE INC., Mountain View, CA (US)

(72) Inventors: Kyu Jin Park, Seoul (KR); Woo-Jin Choi, Seoul (KR)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/941,850

(22) Filed: Nov. 16, 2015

(65) Prior Publication Data

US 2016/0073385 A1   Mar. 10, 2016

Related U.S. Application Data

(63) Continuation of application No. 14/024,979, filed on Sep. 12, 2013, now Pat. No. 9,191,943.

(30) Foreign Application Priority Data

Sep. 13, 2012 (KR) .................. 10-2012-0101747
Mar. 15, 2013 (KR) .................. 10-2013-0027866

(51) Int. Cl.
  *G01R 31/08*  (2006.01)
  *H04W 72/04* (2009.01)
  *H04W 72/14* (2009.01)
  *H04L 5/00*  (2006.01)

(52) U.S. Cl.
  CPC ......... *H04W 72/042* (2013.01); *H04L 5/0053* (2013.01); *H04W 72/14* (2013.01); *H04L 5/0023* (2013.01)

(58) Field of Classification Search
  CPC .. H04W 72/042; H04W 74/14; H04L 5/0053; H04L 5/0023
  See application file for complete search history.

(56) References Cited

U.S. PATENT DOCUMENTS

| | | | |
|---|---|---|---|
| 9,143,984 B2* | 9/2015 | Zhu | H04W 28/02 |
| 9,191,943 B2* | 11/2015 | Park | H04L 5/0053 |
| 9,277,548 B2* | 3/2016 | Liao | H04W 72/042 |
| 9,414,374 B2* | 8/2016 | Seo | H04W 72/042 |
| 2013/0039284 A1 | 2/2013 | Marinier et al. | |

(Continued)

FOREIGN PATENT DOCUMENTS

WO    2012/109542 A1    8/2012

OTHER PUBLICATIONS

Motorola Mobility, "Configuration of EPDCCH", R1-123788, 3GPP TSG RAN WG1 #70, QingDao, P.R. China, Aug. 13-18, 2012, pp. 1-6.

(Continued)

*Primary Examiner* — Robert Wilson
(74) *Attorney, Agent, or Firm* — Colby Nipper

(57) ABSTRACT

The disclosure is related to reception and configuration of a downlink control channel. Particularly, the present disclosure relates to a method and an apparatus (e.g., user equipment) for receiving a downlink control channel located in a data region, and a method and an apparatus (e.g., a transmission/reception point) for configuring and transmitting the downlink control channel.

18 Claims, 7 Drawing Sheets

(56) References Cited

U.S. PATENT DOCUMENTS

| | | | |
|---|---|---|---|
| 2013/0064216 A1* | 3/2013 | Gao | H04L 5/0016 370/330 |
| 2013/0114630 A1* | 5/2013 | Cui | H01S 3/10 372/25 |
| 2013/0155869 A1* | 6/2013 | Wu | H04W 72/042 370/241 |
| 2013/0163551 A1 | 6/2013 | He et al. | |
| 2013/0188577 A1* | 7/2013 | Papasakellariou | H04W 72/04 370/329 |
| 2013/0242904 A1* | 9/2013 | Sartori | H04L 5/0053 370/329 |
| 2013/0301549 A1 | 11/2013 | Chen et al. | |
| 2014/0071918 A1 | 3/2014 | Park et al. | |
| 2014/0092821 A1 | 4/2014 | Zhu et al. | |
| 2015/0036615 A1 | 2/2015 | Shimezawa et al. | |
| 2015/0078277 A1* | 3/2015 | Seo | H04W 72/042 370/329 |
| 2015/0146639 A1* | 5/2015 | Seo | H04L 5/0094 370/329 |
| 2015/0271788 A1* | 9/2015 | Kim | H04L 5/0053 370/329 |
| 2016/0073385 A1* | 3/2016 | Park | H04L 5/0053 370/329 |

OTHER PUBLICATIONS

NEC Group, "ePDCCH search space design", R1-123253, 3GPP TSG RAN WG1 Meeting #70, Qingdao, China, Aug. 13-17, 2012, pp. 1-6.

Renesas Mobile Europe Ltd., "Search space design for ePDCCH", R1-123586, 3GPP TSG RAN WG1 Meeting #70, Qingdao, China, Aug. 13-17, 2012, pp. 1-7.

Huawei et al., "Search space design for ePDCCH", R1-123120, 3GPP TSG RAN WG1 Meeting #70, Qingdao, China, Aug. 13-17, 2012, pp. 1-6.

Samsung, "Search Space Design for Localized ePDCCHs", R1-123487, 3GPP TSG RAN WG1 #70, Qingdao, China, Aug. 13-17, 2012, pp. 1-3.

Korean Intellectual Property Office, International Search Report for International Application No. PCT/KR2013/008282, dated Dec. 23, 2013.

Korean Intellectual Property Office, Written Opinion of the International Searching Authority for International Application No. PCT/KR2013/008282, dated Dec. 23, 2013.

* cited by examiner

RECEPTION AND CONFIGURATION OF DOWNLINK CONTROL CHANNEL

CROSS REFERENCE TO PRIOR APPLICATIONS

The present application is continuation application of U.S. patent application Ser. No. 14/024,979 (filed on Sep. 12, 2013), which claims priority under 35 U.S.C. §119 to Korean Patent Application No. 10-2012-0101747 (filed on Sep. 13, 2012) and Korean Patent Application No. 10-2013-0027866 (filed on Mar. 15, 2013).

BACKGROUND

The present disclosure relates to reception and configuration of a downlink control channel. Particularly, the present disclosure relates to a method and an apparatus (e.g., user equipment) for receiving a downlink control channel located in a data region, and a method and an apparatus (e.g., a transmission/reception point) for configuring and transmitting the downlink control channel.

In order to efficiently use limited resources in a wireless communication system, control channels might be required. However, resources of a control region may correspond to system overhead, and therefore reduce resources of a data region available for data transmission. In a wireless communication system capable of transmitting data to more users, system capacity enhancement might be limited due to the limited resources of a typical control region.

Accordingly, in order to increase control channel resources, a method of transmitting/receiving multi-user control channels using a spatial division multiplexing scheme in the data region might be required. In this case, a search space of a user equipment might be required to be configured such that downlink control information (DCI) is received through the control channels.

SUMMARY

In accordance with at least one embodiment, a method may be provided for receiving a downlink control channel located in a data region, in user equipment (UE). The method may include receiving an enhanced physical downlink control channel (EPDCCH) from a transmission/reception point, through the data region of an N number of physical resource-block (PRB) pairs forming each of a K number of EPDCCH sets in a subframe, wherein (i) the K and N are natural numbers which are greater than or equal to "1", (ii) each of the N number of PRB pairs includes 16 enhanced resource element groups (EREGs), and (iii) an enhanced control channel element (ECCE) corresponding to a basic unit of an EPDCCH transmission includes 4 or 8 EREGs; and decoding the EPDCCH in a corresponding EPDCCH set according to a downlink control information (DCI) format in an EPDCCH UE-specific search space, wherein ECCEs associated with the decoding of the EPDCCH is defined by a function of a radio network temporary identifier (RNTI) of the user equipment, an index of the subframe, an aggregation level, and a total number of ECCEs of the corresponding EPDCCH set.

In accordance with another embodiment, a method may be provided for configuring a downlink control channel located in a data region, in a user equipment (UE)-specific search space, in a transmission/reception point. The method may include defining enhanced control channel elements (ECCEs) corresponding to a basic transmission unit of an enhanced physical downlink control channel (EPDCCH), in an EPDCCH UE-specific search space, wherein (i) the EPDCCH is located in the data region of an N number of physical resource-block (PRB) pairs forming each of a K number of EPDCCH sets in a subframe, (ii) the K and N are natural numbers which are greater than or equal to "1", (iii) each of the N number of PRB pairs includes 16 enhanced resource element groups (EREGs), (iv) each of the ECCEs includes 4 or 8 EREGs, and (v) the ECCEs are defined by a function of a radio network temporary identifier (RNTI) of user equipment, an index of the subframe, an aggregation level, and a total number of ECCEs of a corresponding EPDCCH set; and transmitting the ECCEs defined in the EPDCCH UE-specific search space, through the EPDCCH to the user equipment.

In accordance with still another embodiment, user equipment may be provided for receiving a downlink control channel located in a data region. The user equipment may include a receiver and a control processor. The receiver may be configured to receive an enhanced physical downlink control channel (EPDCCH) from a transmission/reception point, through the data region of an N number of physical resource-block (PRB) pairs forming each of a K number of EPDCCH sets in a subframe. Herein, (i) the K and N are natural numbers which are greater than or equal to "1", (ii) each of the N number of PRB pairs includes 16 enhanced resource element groups (EREGs), and (iii) an enhanced control channel element (ECCE) corresponding to a basic unit of an EPDCCH transmission includes 4 or 8 EREGs. The control processor may be configured to decode the EPDCCH in a corresponding EPDCCH set according to a downlink control information (DCI) format in an EPDCCH UE-specific search space, wherein ECCEs associated with the decoding of the EPDCCH is defined by a function of a radio network temporary identifier (RNTI) of the user equipment, an index of the subframe, an aggregation level, and a total number of ECCEs of the corresponding EPDCCH set.

In accordance with still another embodiment, a transmission/reception point may be provided for configuring a downlink control channel located in a data region, in an EPDCCH user equipment (UE)-specific search space. The transmission/reception point may include a control processor and a transmitter. The control processor may be configured to define enhanced control channel elements (ECCEs) corresponding to a basic transmission unit of an EPDCCH, in the EPDCCH UE-specific search space. Herein, (i) the EPDCCH is located in the data region of an N number of physical resource-block (PRB) pairs forming each of a K number of EPDCCH sets in a subframe, (ii) the K and N are natural numbers which are greater than or equal to "1", (iii) each of the N number of PRB pairs includes 16 enhanced resource element groups (EREGs), (iv) each of the ECCEs includes 4 or 8 EREGs, and (v) the ECCEs are defined by a function of a radio network temporary identifier (RNTI) of user equipment, an index of the subframe, an aggregation level, and a total number of ECCEs of a corresponding EPDCCH set. The transmitter may be configured to transmit the ECCEs defined in the EPDCCH UE-specific search space, through the EPDCCH to the user equipment.

In the case that user equipment is configured to receive downlink control information (DCI) through an enhanced physical downlink control channel (EPDCCH) corresponding to a newly-adopted downlink control channel, the present embodiments are related to methods and apparatuses for performing a blind decoding per aggregation level (AL) in an EPDCCH set (or EPDCCH sets) for the user equipment.

DETAILED DESCRIPTION OF EMBODIMENTS

Figure 1:
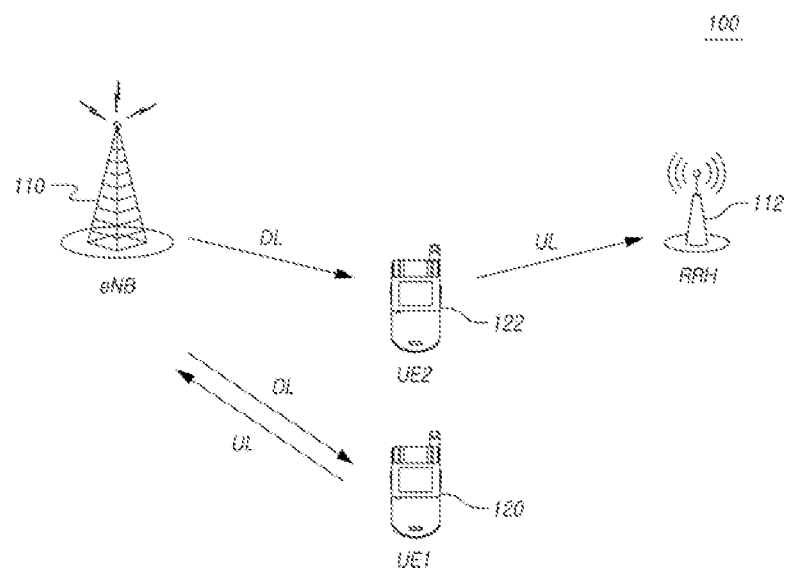
FIG. 1 is an exemplary diagram illustrating a wireless communication system to which at least one embodiment may be applied.

Hereinafter, exemplary embodiments of the present invention will be described with reference to the accompanying drawings. In the following description, the same elements will be designated by the same reference numerals although they are shown in different drawings. Furthermore, in the following description of the present embodiment, a detailed description of known functions and configurations incorporated herein will be omitted when it may make the subject matter of the present embodiment unclear.

A wireless communication system in accordance with at least one embodiment may be widely used in order to provide a variety of communication services such as a voice service, a packet data service, and so forth. The wireless communication system may include user equipment (UE) and at least one transmission/reception point. In the present description, the term "user equipment" or "(UE)" is used as a general concept that includes a terminal in wireless communication. Accordingly, the user equipment should be construed as a concept that includes a mobile station (MS), a user terminal (UT), a subscriber station (SS), and/or a wireless device in a global system for mobile communications (GSM), as well as user equipment used in wideband code division multiple access (WCDMA), long term evolution (LTE), and/or high speed packet access (HSPA).

The transmission/reception point may indicate a station that communicates with the user equipment. Such a transmission/reception point may be referred to with different terms, for example, a base station (BS), a cell, a Node-B, an evolved Node-B (eNB), a sector, a site, a base transceiver system (BTS), an access point (AP), a relay node (RN), a remote radio head (RRH), a radio unit (RU), an antenna, and the like.

That is, in the present description, the transmission/reception point, the base station (BS) or the cell may be construed as an inclusive concept indicating a portion of an area or a function covered by a base station controller (BSC) in code division multiple access (CDMA), a Node-B in WCDMA, an eNB or a sector (a site) in LTE, and the like. Accordingly, a concept of the transmission/reception point, the base station (BS), and/or the cell may include a variety of coverage areas such as a megacell, a macrocell, a microcell, a picocell, a femtocell, and the like. Furthermore, such concept may include a communication range of the relay node (RN), the remote radio head (RRH), or the radio unit (RU).

In the present description, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present embodiment, and may not be limited to a specific term or word. Herein, an uplink (UL) transmission/reception is a scheme in which data is transmitted from user equipment to a transmission/reception point. Alternatively, a downlink (DL) transmission/reception is a scheme in which data is transmitted from the transmission/reception point to the user equipment.

The wireless communication system may use a variety of multiple access schemes such as CDMA, time division multiple access (TDMA), frequency division multiple access (FDMA), orthogonal frequency division multiple access (OFDMA), OFDM-FDMA, OFDM-TDMA, OFDM-CDMA, and/or the like. Such multiple access schemes, however, are not limited thereto. At least one embodiment may be applied to resource allocation in the field of asynchronous wireless communications evolving to LTE and LTE-advanced (LTE-A) through GSM, WCDMA, and HSP, and in the field of synchronous wireless communications evolving into CDMA, CDMA-2000, and UMB. The present embodiment should not be construed as being limited to or restricted by a particular wireless communication field, and should be construed as including all technical fields to which the spirit of the present embodiment can be applied.

In the case of an uplink transmission and a downlink transmission, at least one of a time division duplex (TDD) and a frequency division duplex (FDD) may be used. Herein, the TDD may perform the uplink/downlink transmissions using different times. The FDD may perform the uplink/downlink transmissions using different frequencies.

In a LTE or LTE-A system in conformance with a corresponding standard, an uplink and/or a downlink may be formed based on one carrier or a pair of carriers. In the case of the uplink and/or downlink, control information may be transmitted through such control channels as a physical downlink control channel (PDCCH), a physical control format indicator channel (PCFICH), a physical hybrid ARQ indicator channel (PHICH), a physical uplink control channel (PUCCH), and/or so forth. Data may be transmitted through such data channels as a physical downlink shared channel (PDSCH), a physical uplink shared channel (PUSCH), and/or the like. In the present specification, PDCCH may be a concept including EPDCCH.

In the present description, the term "cell" may indicate one of coverage of a signal transmitted from a transmission point or transmission/reception point, a component carrier having the coverage, and the transmission/reception point. Herein, the term "transmission/reception point" may indicate one of a transmission point transmitting a signal, a reception point receiving a signal, and a combination thereof (i.e., a transmission/reception point).

In the present description, the term "HARQ ACK/NACK" is an abbreviation of "hybrid automatic repeat request (HARQ)-acknowledgment (ACK)/negative acknowledgement (NACK)," and may be referred to as a hybrid-ARQ acknowledgement, or a hybrid ACK/NACK signal. Channel state information (CSI) might mean a channel state information report such as a rank indicator (RI), a precoding matrix indicator (PMI), and a channel quality indicator (CQI).

FIG. 1 is an exemplary diagram illustrating a wireless communication system to which at least one embodiment may be applied.

Referring to FIG. 1, wireless communication system 100 may be one of a coordinated multi-point transmission/reception (CoMP) system, a coordinated multi-antenna transmission system, and a coordinated multi-cell communication system. Herein, the CoMP system may transmit signals through cooperation between a plurality of transmission/reception points. Wireless communication system 100 such as a CoMP system may include a plurality of transmission/reception points 110 and 112, and at least one user equipment (UE) 120 and 122.

The transmission/reception points may be, as shown in the figure, one of a first transmission/reception point (e.g., eNB 110) and a second transmission/reception point (e.g., RRH 112). Herein, the first transmission/reception point (e.g., eNB 110) may be a base station or a macrocell (or macronode). The second transmission/reception point (e.g., RRH 112) may be at least one picocell which is wiredly controlled by coupling to the first transmission/reception point (e.g., eNB 110) through an optical cable or an optical fiber. Furthermore, The second transmission/reception point (e.g., RRH 112) may have either a high transmission power, or a low transmission power within a macrocell region. The first and second transmission/reception points (e.g., eNB 110 and RRH 112) may have the same cell identity (ID) or different cell identities.

Hereinafter, a downlink (DL) may represent communication or a communication path from transmission/reception points 110 and 112 to user equipment 120. An uplink (UL) may represent communication or a communication path from user equipment 120 to transmission/reception points 110 and 112. In the downlink, a transmitter may be a portion of transmission/reception points 110 and 112, and a receiver may be a portion of user equipment 120 and 122. In the uplink, a transmitter may be a portion of user equipment 120, and a receiver may be a portion of transmission/reception points 110 and 112.

Hereinafter, a situation in which a signal is transmitted or received through such channels as PUCCH, PUSCH, PDCCH, and/or PDSCH may be referred to by the expression "transmit or receive PUCCH, PUSCH, PDCCH, and/or PDSCH."

The first transmission/reception point (e.g., eNB 110) corresponding to one of transmission/reception points (e.g., 110 and 112) may perform a downlink transmission to user equipment 120 and 122. The first transmission/reception point (e.g., eNB 110) may transmit PDSCH corresponding to a primary physical channel, for unicast transmission. Furthermore, the first transmission/reception point (e.g., eNB 110) may transmit PDCCH in order to transmit downlink control information, such as scheduling information required for receiving PDSCH, and to transmit scheduling grant information for an uplink data channel (e.g., PUSCH) transmission. Hereinafter, "transmit or receive a signal through a channel" may be referred to as the expression of "transmit or receive a channel."

In a wireless communication, one radio frame may include 10 subframes, and one subframe may include two slots. The radio frame may have a length of 10 ms, and the subframe may have a length of 1.0 ms. Typically, a basic unit of a data transmission may be a subframe, and a downlink or uplink scheduling may be performed in a unit of subframes. In the case of a normal cyclic prefix (CP), one slot may include 7 OFDM symbols in the time domain. In the case of an extended cyclic prefix (CP), one slot may include 6 OFDM symbols in the time domain.

For example, the frequency domain in a wireless communication may be formed in a unit of subcarriers having an interval of 15 kHz.

In a downlink, time-frequency resources may be determined in a unit of resource blocks (RBs). A resource block (RB) may consist of one slot in the time axis and 180 kHz (12 subcarriers) in the frequency axis. Resource elements consisting of 'one subcarrier (corresponding to 2 slots) in the time axis' and '12 subcarriers in the frequency axis' may be referred to as 'a resource-block pair (RBP).' A total number of resource blocks may differ according to a system bandwidth. A physical resource block (PRB) pair including a PRB in a first slot and a PRB in a second slot having an identical PRB index may correspond to a basic unit of resource allocation in one downlink subframe. In the present description, such PRB pair may be simply referred to as "PRB." A resource element (RE) may consist of one OFDM symbol in the time axis and one subcarrier in the frequency axis. One resource-block pair (RBP) may include '14×12 resource elements' (in the case of a normal CP) or '12×12 resource elements' (in the case of an extended CP).

Figure 2:
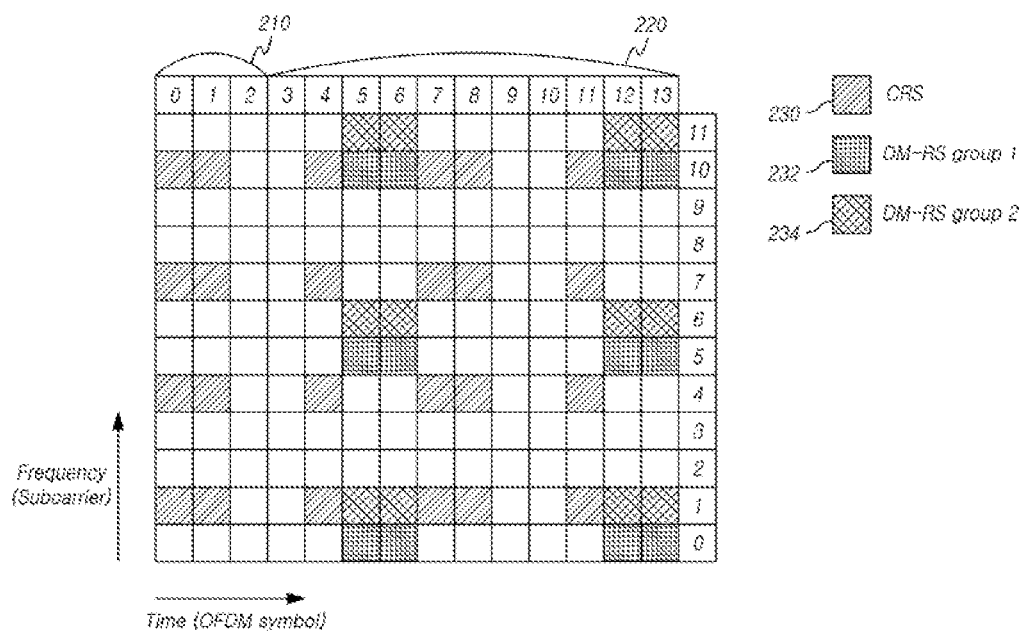
FIG. 2 illustrates one resource-block pair in the case of a normal cyclic prefix (normal CP), as an example of a structure of downlink resources in a long term evolution (LTE) or LTE-Advanced (LTE-A) system.

FIG. 2 illustrates one resource-block pair (RBP) in the case of a normal cyclic prefix (normal CP), as an example of a structure of downlink resources in a long term evolution (LTE) or LTE-Advanced (LTE-A) system.

Referring to FIG. 2, in the case of a normal cyclic prefix (CP), one resource-block pair (RBP) may include 14 OFDM symbols (l=0, 1, . . . , 13) and 12 subcarriers (k=0, . . . , 11). In an embodiment shown in FIG. 2, one resource-block pair (RBP) may include 14 OFDM symbols. Among the 14 OFDM symbols, preceding three OFDM symbols (l=0~2) may correspond to control region 210 assigned for control channels such as a physical control format indicator channel (PCFICH), a physical hybrid ARQ indicator channel (PHICH), a physical downlink control channel (PDCCH), and so forth. The remaining OFDM symbols (l=3~13) may correspond to data region 220 assigned for data channels such as a physical downlink shared channel (PDSCH). Although three OFDM symbols are allocated for control region 210 in FIG. 2, one to four OFDM symbols may be allocated for control region 210, according to various embodiments. Information on the size of control region 210 may be transferred through the PCFICH. Herein, the size information may be set as the number of OFDM symbols.

PDCCH may be transmitted through an entire system bandwidth, PDSCH may be transmitted based on resource blocks. User equipment may identify a corresponding PDCCH (i.e., a PDCCH assigned to the user equipment), and enter a micro sleep mode when there is no data (i.e., data for the user equipment) in the corresponding PDCCH. Accordingly, it may be possible to reduce a power consumption of the user equipment in data region 220.

Referring to FIG. 2, reference signals may be mapped to specific resource elements of a downlink. That is, a common reference signal (or cell-specific reference signal, hereinafter referred to as "CRS") 230, demodulation reference signals (DM-RS) (or UE-specific reference signals) 232 and 234, a channel-state information reference signal (CSI-RS), and so forth may be transmitted through a downlink. In FIG. 2, only CRS 230 and DM-RS 232 and 234 have been illustrated for convenience of description.

CRS 230 in control region 210 may be used to perform channel estimation for decoding of PDCCH. CRS 230 in data region 220 may be used for downlink channel measurement. Channel estimation for data decoding of data region 220 may be performed using DM-RSs 232 and/or 234. DM-RSs 232 and 234 may be multiplexed using orthogonal codes, as reference signals for a plurality of layers. For example, in the case of 4-layer transmission, two different reference signals for each reference signal group may be multiplexed by applying 'an orthogonal code having a length of 2' to 'two consecutive reference signal resource elements in the time axis.' In the case of 8-layer transmission, four different reference signals for each reference signal group may be multiplexed by applying 'an orthogonal code having a length of 4' to 'four reference signal resource elements distributed in the time axis.'

In the case of 1-layer transmission or 2-layer transmission, since a reference signal of each layer may be transmitted using only one DM-RS group (e.g., DM-RS group 1 (232)), another DM-RS group (e.g., DM-RS group 2 (234)) may be used for a data transmission. DM-RS corresponding to each layer may be pre-coded according to a pre-coding scheme applied to each layer, and be transmitted to user equipment. Accordingly, a receiving side (e.g., user equipment) may perform a data decoding without pre-coding information applied in a transmitting side (e.g., a base station).

In order to efficiently use limited resources in a wireless communication system, a control channel might be required. However, resources of control region 210 may correspond to system overhead, and therefore reduce resources of data region 220 available for data transmission. In an LTE system based on OFDM, one resource-block pair (RBP) may include 14 or 12 OFDM symbols. Among the OFDM symbols, a maximum of 3 OFDM symbols may be used for control region 210, and the remaining OFDM symbols may be used for data region 220. Meanwhile, in an LTE-A system capable of transmitting data to more users, system capacity enhancement may be limited due to limited resources of a typical control region (e.g., 210). Accordingly, in order to increase control channel resources, considering a method of transmitting/receiving multi-user control channels might be required, such as using a spatial division multiplexing scheme in data region 220. In other words, such method may transmit/receive control channels in data region 220. For example, a control channel transmitted in data region 220 may be referred to as 'extended PDCCH' or 'enhanced PDCCH' (EPDCCH), but is not limited thereto.

As described above, in a typical (or existing) 3GPP LTE/LTE-A rel-8/9/10 system, in order to receive a downlink DCI, all user equipment depend on the PDCCH which is transmitted through 'the first one, two, or three OFDM symbols' (in the case that system bandwidth >10 PRBs) or 'the first two, three, or four OFDM symbols' (in the case that system bandwidth ≤10 PRBs) in a downlink subframe. A basic unit of a PDCCH transmission for a given user equipment may be a control channel element (CCE). Herein, one CCE may include 9 resource element groups (REGs). One REG may include four consecutive resource elements (REs) in the frequency axis. Particularly, the four consecutive resource elements (REs) of the one REG may be selected, among the remaining resource elements (REs) excluding resource elements (REs) transmitting different physical channels (e.g., PCFICH, PHICH) and physical signals (e.g., CRS) in a PDCCH region of a corresponding downlink subframe.

In order to perform an EPDCCH resource mapping for a given user equipment, an enhanced REG (EREG) or enhanced CCE (ECCE) corresponding to an REG or CCE of a typical PDCCH may be employed or defined in the EPDCCH.

As described above, in a typical (or existing) 3GPP LTE/LTE-A rel-8/9/10 system, in order to receive a downlink DCI, all user equipment perform a blind decoding of the PDCCH which is transmitted through 'the first one, two, or three OFDM symbols' (in the case that system bandwidth >10 PRBs) or 'the first two, three, or four OFDM symbols' (in the case that system bandwidth ≤10 PRBs) in a downlink subframe. In this case, in order to provide a sufficient processing time for a PDSCH reception of user equipment and to reduce a power consumption of the user equipment, a blind decoding may be performed in a restricted search space, as many times as the number of blind decodings restricted per aggregation level (AL), based on a corresponding DCI format determined according to a PDSCH/PUSCH transmission mode. That is, the blind decoding is not performed based on all aggregation levels (ALs) and DCI formats, in an entire PDCCH region.

Figure 3:
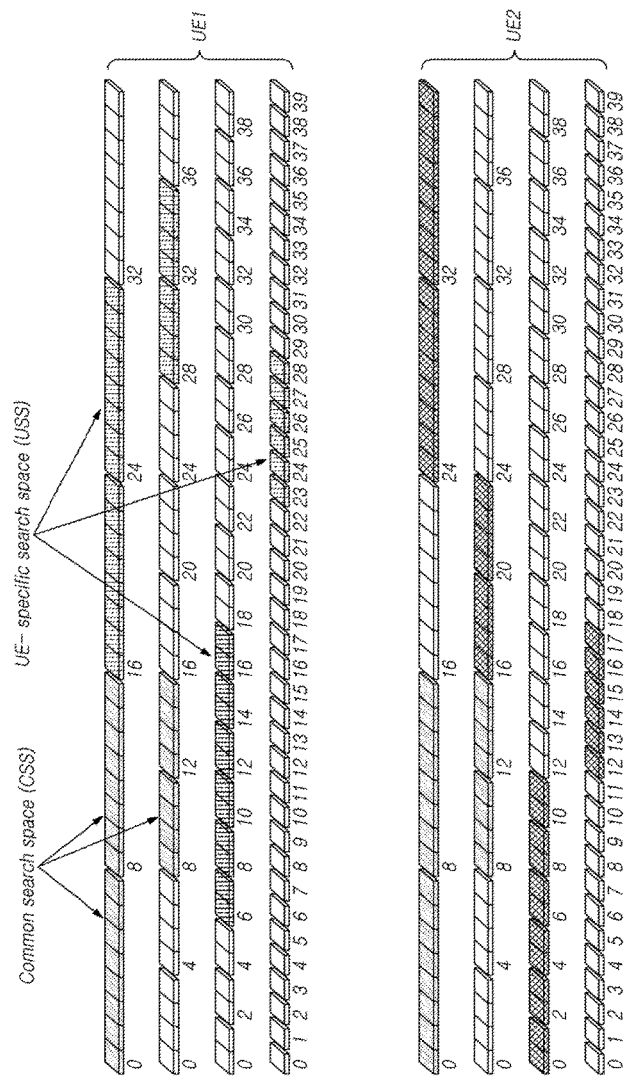
FIG. 3 illustrates search spaces in two user equipment.

FIG. 3 illustrates search spaces in two user equipment.

Referring to FIG. 3, a given user equipment according to 3GPP LTE/LTE-A rel-8/9/10 may perform the restricted number of blind decodings according to aggregation levels (ALs) in a 'common search space (CSS)' region and a 'UE-specific search space (USS)' region (or referred to herein as "a terminal-specific search space region") in a PDCCH transmitted through a downlink subframe. Herein, the CSS region is commonly configured for all user equipment within a cell to which a corresponding user equipment belongs. The USS region is uniquely configured per user equipment.

A corresponding PDCCH region may be divided into control channel elements (CCEs) corresponding to a basic unit of resource allocation for a DCI transmission. PDCCHs for a given user equipment may be defined to be transmitted through 1, 2, 4, or 8 CCEs according to aggregation levels. Furthermore, the given user equipment may perform a blind decoding. A transmission mode (TM) dependent DCI format (e.g., DCI formats 1/1B/1D/2/2A/2B/2C for a downlink, and DCI format 4 for an uplink) associated with the blind decoding of the given user equipment may be determined according to a PDSCH transmission mode (TM) and a PUSCH transmission mode (TM). Herein, the PDSCH TM and the PUSCH TM may be configured by higher-layer signaling, according to capabilities of a transmission/reception point and user equipment (e.g., the number of Tx/Rx antennas in each transmission/reception point and/or each user equipment) and a channel state between the user equipment and the transmission/reception point. Accordingly, a blind decoding in the given user equipment may be performed according to a corresponding TM dependent DCI format and/or a fallback DCI format (e.g., DCI formats 0/1A), in a UE-specific search space (USS) as many times as the number of blind decodings determined per aggregation level (AL). Herein, the USS may be determined by a function of a cell-radio network temporary identifier (C-RNTI), a slot index, and an aggregation level, associated with the given user equipment, as defined by Formula 1 below.

$$L\{(Y_k+m') \bmod \lfloor N_{CCE,k}/L \rfloor\}+i \qquad \text{[Formula 1]}$$

Herein, i=0, . . . , L−1, and m'=m+M$^{(L)}$·n$_{CI}$·n$_{CI}$ denotes a carrier indicator field value, and m=0, . . . , M$^{(L)}$−1. M$^{(L)}$ denotes the number of PDCCH candidates to monitor in a given search space. L denotes an aggregation level (AL), and L∈{1,2,4,8} in a UE-specific search space.

Furthermore, Y$_k$=(A·Y$_{k-1}$) mod D, where A=39827, D=65537, and k=⌊n$_s$/2⌋. n$_s$ denotes the slot number within a radio frame.

Accordingly, a given user equipment according to 3GPP LTE/LTE-A rel-8/9/10 may perform a blind decoding for DCI formats configured to be received by the user equipment. Herein, the blind decoding may be performed in a corresponding UE-specific search space (USS) (i.e., a USS for the given user equipment) at each of the aggregation levels 1, 2, 4, and 8. Particularly, the blind decoding may be performed 6, 6, 2, or 2 times according to the aggregation level 1, 2, 4, or 8. In other words, the blind decoding may be performed 16 times for each of a PDSCH TM dependent DCI format and a fallback DCI format, and therefore be performed up to a total of 32 times. Meanwhile, in the case that a given user equipment is configured as PUSCH transmission mode (TM) 2, a blind decoding may be further performed 16 times for DCI format 4. Accordingly, in this case, the blind decoding may be performed up to a total of 48 times.

In the case that user equipment is configured to receive DCI through EPDCCH newly adopted (or defined) in 3GPP LTE/LTE-A rel-11, a blind decoding may be defined to be performed in an EPDCCH USS (i.e., a UE-specific search space of the EPDCCH) in place of a legacy PDCCH USS (i.e., a UE-specific search space of a legacy PDCCH), in a downlink subframe for an EPDCCH monitoring. Furthermore, in this case, a K ("K≥1") number of EPDCCH sets may be determined as the EPDCCH USS for a corresponding user equipment (i.e., user equipment configured to receive DCI through a corresponding EPDCCH) by higher-layer RRC signaling, along with configuration of the downlink subframe for the EPDCCH monitoring as described above. Herein, a maximum value of the 'K' may be one of 2, 3, 4, and 6. Each EPDCCH set may include a group of PRBs (e.g., an N number of PRBs, where the N is a natural number which is greater than or equal to "1" and is less than or equal to the number of PRBs associated with the downlink bandwidth).

Furthermore, each EPDCCH set may be determined as one of a distributed type and a localized type, and be signaled according to the determined type.

EPDCCH sets may correspond to a localized type or a distributed type according to EPDCCH transmission types. The above-described 'N' may be 2, 4, or 8 for both of a localized type and a distributed type, and is not limited thereto.

Figure 4:
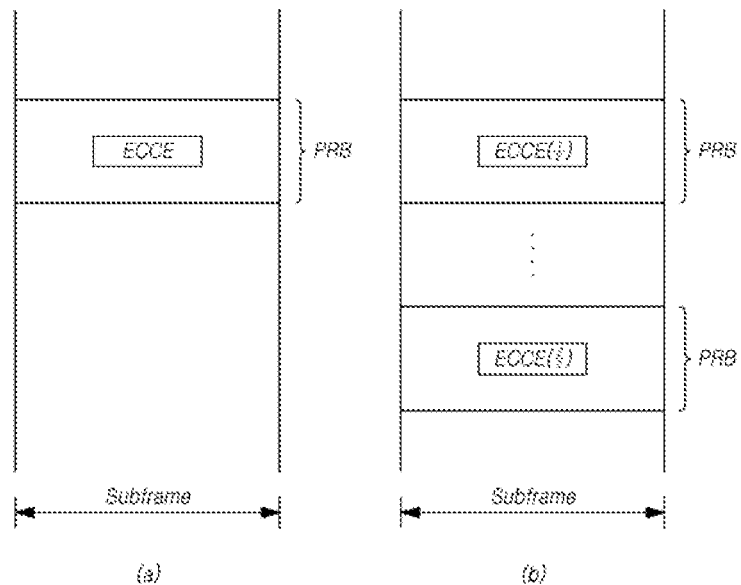
FIG. 4 illustrates two types of EPDCCH transmissions including a localized EPDCCH transmission and a distributed EPDCCH transmission.

FIG. 4 illustrates two types of EPDCCH transmissions including a localized EPDCCH transmission and a distributed EPDCCH transmission.

EPDCCH may be transmitted through a corresponding PDSCH region. In this case, a transmission type of the EPDCCH may correspond to one of a localized EPDCCH transmission and a distributed EPDCCH transmission, as shown in FIGS. 4a and 4b. Accordingly, an ECCE structure and the number of resource elements (REs) forming one ECCE may differ according to each EPDCCH transmission type. Alternatively, the ECCE structure and the number of resource elements (REs) per ECCE may be the same regardless of EPDCCH transmission types.

The localized EPDCCH transmission as shown in FIG. 4a may illustrate that one ECCE is located and transmitted in one resource-block pair (e.g., one PRB pair). The distributed EPDCCH transmission as shown in FIG. 4b may illustrate that one ECCE is located and transmitted in at least two resource-block pairs (e.g., at least two PRB pairs).

Meanwhile, the K ("K≥1") number of EPDCCH sets may be assigned for one user equipment. In this case, since each EPDCCH set is of either a distributed type or a localized type, a K$_L$ number of localized EPDCCH sets and a K$_D$ number of distributed EPDCCH sets may be assigned for one user equipment. That is, a sum of K$_L$ and K$_D$ may be "K" (K$_L$+K$_D$=K). In other words, a K number of EPDCCH sets (or set) may be classified into (i) a K$_L$ number of localized EPDCCH sets (or set) and (ii) a K$_D$ number of distributed EPDCCH sets (or set). Herein, K$_L$ and K$_D$ satisfy K=K$_L$+K$_D$.

However, a total number of blind decodings of user equipment may be determined to be the same as in a typical (or legacy) system, regardless of values of N, K, K$_L$, and K$_D$ described above. Accordingly, in the case that a K number of EPDCCH sets are configured for a given EPDCCH user equipment, the number of blind decodings per aggregation level (AL) to be performed by a corresponding user equipment in each EPDCCH set may be determined. Furthermore, a size of a search space required per corresponding aggregation level (AL) may be determined according to the number of blind decodings per aggregation level (AL) in a corresponding EPDCCH set.

In a typical wireless communication system, a search space size associated with a blind decoding per aggregation level (AL) may be determined according to the number of blind decodings. That is, in the case of PDCCH aggregation level (AL) 1, a blind decoding is defined to be performed 6 times, and therefore a UE-specific search space (USS) for the PDCCH aggregation level (AL) 1 is configured with 6 CCEs. Likewise, USSs for PDCCH aggregation levels (ALs) 2, 4, and 8 are determined in a same manner. More specifically, in the case of PDCCH AL 2, a blind decoding is defined to be performed 6 times, and therefore USS for PDCCH AL 2 is configured with 12 (=2×6) CCEs. In the case of PDCCH AL 4 and PDCCH AL 8, each corresponding blind decoding is defined to be performed 2 times, and therefore USSs for PDCCH AL 4 and PDCCH AL 8 are configured with 8 CCEs and 16 CCEs, respectively.

However, it might be highly possible that a size of an EPDCCH set is determined to be larger than a size of a search space typically required per aggregation level (AL). Accordingly, in the case that a size of the EPDCCH set is larger than a search space size determined based on the number of blind decodings per aggregation level (AL) to be performed in a corresponding EPDCCH set, defining configuration of a search space per aggregation level (AL) in a corresponding EPDCCH set might be required.

In the case that user equipment is configured to receive downlink control information (DCI) through an EPDCCH corresponding to a newly-adopted downlink control channel, the present embodiments may provide methods and apparatuses for performing a blind decoding per aggregation level (AL) in a corresponding EPDCCH set (or EPDCCH sets) for the user equipment. Particularly, the present embodiments may provide a method and an apparatus for configuring a search space per aggregation level (AL) to be monitored by a corresponding user equipment, in each EPDCCH set configured for the corresponding user equipment.

As described above, in the case that a given user equipment is configured to receive downlink control information (DCI) through an EPDCCH, a K ("K≥1") number of EPDCCH sets (or set) may be configured for the user equipment. In this case, each EPDCCH set may include a group of PRBs (i.e., an N number of PRBs). Furthermore, in the case of each EPDCCH set, a type of a corresponding EPDCCH set may be determined as a distributed type or a localized type. In other words, a K number of EPDCCH sets (or set) configured for an EPDCCH user equipment may be configured with (i) a $K_L$ number of localized EPDCCH sets (or set) and (ii) a $K_D$ number of distributed EPDCCH sets (or set). Herein, the EPDCCH user equipment represents user equipment to which EPDCCH is applied. $K_L$ and $K_D$ satisfy $K=K_L+K_D$.

One PRB included in each localized or distributed EPDCCH set may be configured with a total of 16 EREGs (e.g., EREG #0 to EREG #15) in a corresponding PRB pair regardless of a subframe type, a length of a cyclic prefix (CP), and the presence of other physical signals.

In the case of a newly-defined EREG/ECCE, a total of 16 EREGs (e.g., EREG #0 to EREG #15) may be included in one PRB pair of each EPDCCH set. Particularly, the one PRB pair may include a total of 16 EREGs, regardless of (i) a frame structure type, (ii) a subframe configuration, (iii) a length of a cyclic prefix (CP), (iv) a size of a legacy PDCCH control region, and/or (v) whether there are other reference signals (e.g., CRS, CSI-RS, PRS, etc.) excluding DM-RS.

More specifically, in the case of a normal cyclic prefix (CP), one PRB pair in a certain EPDCCH set may include a total of 168 resource elements (REs) (e.g., 12×14=168 REs). In this case, an EREG indexing may be performed for the remaining resource elements (REs) (e.g., 144 REs) excluding '24 resource elements (REs) for DM-RS' from the 168 resource elements (REs). In other words, the EREG indexing may be performed using 16 numbers (e.g., 0, 1, 2, . . . , 15) according to a frequency-first scheme (i.e., a frequency first and then time manner). Accordingly, corresponding resource elements (REs) may be numbered (i.e., indexed) from 0 to 15. Similarly, in the case of an extended cyclic prefix (CP), one PRB pair in a certain EPDCCH set may include a total of 144 resource elements (REs) (e.g., 12×12=144 REs). In this case, an EREG indexing may be performed for the remaining resource elements (REs) (e.g., 128 REs) excluding '16 resource elements (REs) for DM-RS' from the 144 resource elements (REs). In other words, the EREG indexing may be performed using 16 numbers (e.g., 0, 1, 2, . . . , 15) according to a frequency-first scheme (i.e., a frequency first and then time manner). Accordingly, corresponding resource elements (REs) may be numbered (i.e., indexed) from 0 to 15.

Figure 5:
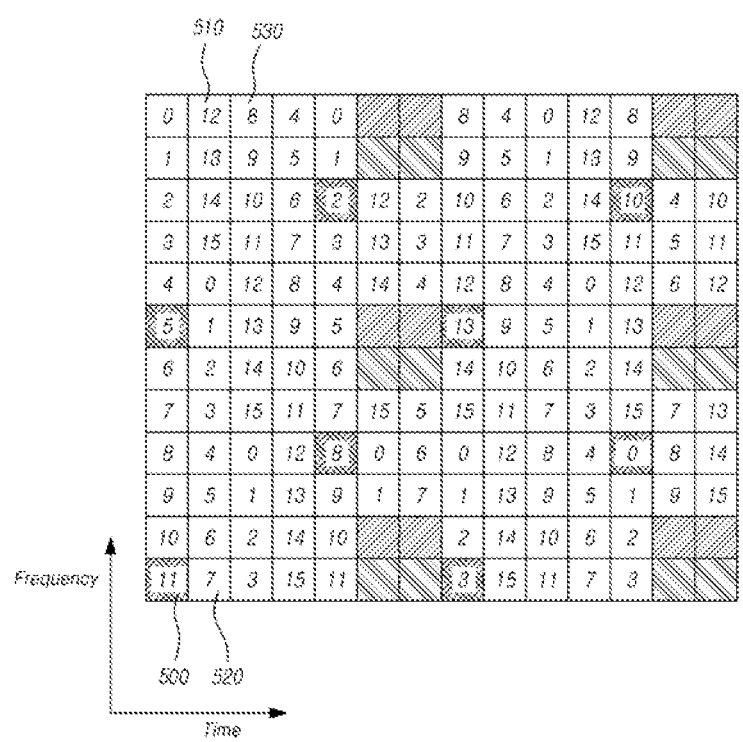
FIG. 5 illustrates a resource element (RE) mapping of a physical resource block (PRB) pair indexed according to an EREG indexing procedure in the case of one transmission antenna port (CRS port 0)
Figure 6:
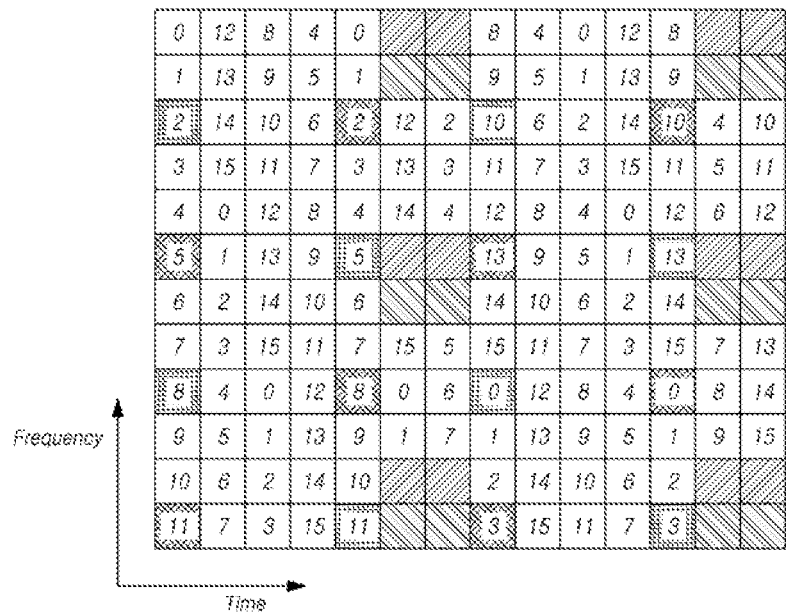
FIG. 6 illustrates an RE mapping of a PRB pair indexed according to an EREG indexing procedure in the case of two transmission antenna ports (CRS ports 0 and 1)
Figure 7:
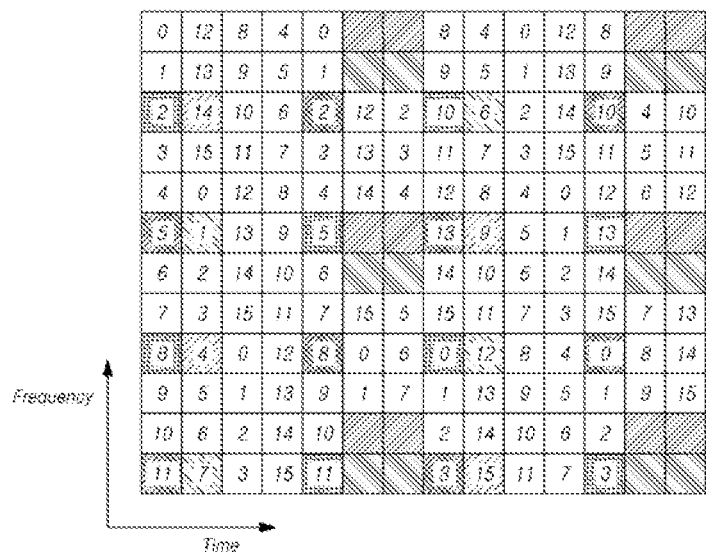
FIG. 7 illustrates an RE mapping of a PRB pair indexed according to an EREG indexing procedure in the case of four transmission antenna ports (CRS ports 0, 1, 2, and 3)

In a downlink subframe corresponding to a normal cyclic prefix (CP) ("a normal DL subframe"), embodiments associated with an EREG indexing procedure for one PRB pair in a certain EPDCCH set will be described with reference to FIG. 5 to FIG. 7. In FIG. 5 to FIG. 7, deviant crease line portions without numerals may represent resource elements (REs) used for DS-RS, and deviant crease line portions or lattice-pattern portions with numerals may represent resource elements (REs) used for a CRS transmission.

FIG. 5 illustrates a resource element (RE) mapping of a physical resource block (PRB) pair indexed according to an EREG indexing procedure in the case of one transmission antenna port (CRS port 0). FIG. 6 illustrates an RE mapping of a PRB pair indexed according to an EREG indexing procedure in the case of two transmission antenna ports (CRS ports 0 and 1). FIG. 7 illustrates an RE mapping of a PRB pair indexed according to an EREG indexing procedure in the case of four transmission antenna ports (CRS ports 0, 1, 2, and 3).

Referring to FIG. 5 to FIG. 7, EREGs may be numbered (i.e., indexed) from 0 to 15 according to a frequency-first scheme (i.e., a frequency first and then time manner). In embodiments shown in FIG. 5 to FIG. 7, indexing may be performed without a symbol-based cyclic shift. More specifically, as shown in FIG. 5, after a resource element (RE) indicated by "500" in the first symbol is indexed as 11 (i.e., index 11), an RE indicated by "510" in the second symbol is continuously indexed as 12 (i.e., index 12). Herein, the RE ("510") indexed as 12 (i.e., the RE ("510") corresponding to a next turn) is not adjacent to the RE ("500") indexed as 11. In the same manner, after an RE indicated by "520" in the second symbol is indexed as 7 (i.e., index 7), an RE indicated by "530" in a third symbol is continuously indexed as 8 (i.e., index 8). Herein, the RE ("530") indexed as 8 (i.e., the RE ("530") corresponding to a next turn) is not adjacent to the RE ("520") indexed as 7.

In FIG. 5 to FIG. 7, REs having an identical index may be grouped into one EREG. Accordingly, in the case of one PRB pair, a total of 16 EREGs (e.g., EREG #0 to EREG #15) may be assigned. FIG. 5 to FIG. 7 illustrate embodiments associated with a PRB pair with a normal CP. That is, one PRB pair with the normal CP may include a total of 16 EREGs. Similarly, even in the case of one PRB pair with an extended CP, a total of 16 EREGs (e.g., EREG #0 to EREG #15) may be assigned. That is, one PRB pair with the extended CP may include a total of 16 EREGs.

Each ECCE corresponding to a basic unit of an EPDCCH transmission may include an 'M' number of EREGs according to a subframe type and a CP length. More specifically, the M value may be determined as below.

In at least one embodiment, in the case of (i) normal subframes with a normal CP and (ii) special subframes with special subframe configuration 3, 4, or 8 and a normal CP, the M value may be determined as '4' (M=4). In other words, in this case, if 16 EREGs are included in one PRB pair, a total of 4 ECCEs may be configured since each ECCE consists of 4 EREGs.

In other embodiments, in the case of (i) normal subframes with an extended CP, (ii) special subframes with special subframe configuration 1, 2, 6, 7, or 9 and a normal CP, and (iii) special subframes with special subframe configuration 1, 2, 3, 5, or 6 and an extended CP, the M value may be determined as '8' (M=8). In other words, in this case, if 16 EREGs are included in one PRB pair, a total of 2 ECCEs may be configured since each ECCE consists of 8 EREGs.

Accordingly, one EPDCCH set formed for a given user equipment may be configured with (i) a '2N' number of ECCEs (in the case that one ECCE consists of 8 EREGs) or (ii) a '4N' number of ECCEs (in the case that one ECCE consists of 4 EREGs), according to a PRB size (i.e., an N value, for example, the number of PRBs) associated with one EPDCCH set, a type of a downlink subframe, a length of a cyclic prefix (CP), and so forth.

Furthermore, user equipment may be configured to monitor an EPDCCH. For normal subframes and normal CP when the number of REs for possible EPDCCH transmission is less than a threshold value ($X_{thresh}$), and for special subframes with special subframe configuration 3, 4, or 8 and normal CP when the number of REs for possible EPDCCH transmission is less than a threshold value ($X_{thresh}$) (hereinafter referred to as "Case 1"), a localized EPDCCH set may be defined to support aggregation levels 2, 4, 8, and 16, and a distributed EPDCCH may be defined to support aggregation levels 2, 4, 8, 16, and 32.

Otherwise (hereinafter referred to as "Case 2"), a localized EPDCCH set may be defined to support aggregation levels 1, 2, 4 and 8, and a distributed EPDCCH may be defined to support aggregation levels 1, 2, 4, 8, and 16.

As described above, a total number of blind decoding attempts performed in a corresponding user equipment may be required to be the same as in a typical (or existing) user equipment, regardless of (i) the number ("K") of EPDCCH sets configured for the corresponding user equipment, (ii) a type of each corresponding EPDCCH set, and (iii) aggregation levels supported in a corresponding EPDCCH set. Accordingly, a total number of blind decoding attempts performed in the corresponding user equipment may be required to be '32' or '48' according to a PUSCH transmission mode (TM), as described above.

The present embodiment may provide a method and an apparatus for determining a search space for a blind decoding of a given user equipment, in an EPDCCH set configured for the given user equipment according to an EPDCCH design criteria. More specifically, the present embodiment may provide a method and an apparatus for determining a search space in which the blind decoding is performed based on each aggregation level by the given user equipment. In other words, in the present embodiment, an EPDCCH set may be configured with (i) a '2N' number of ECCEs (e.g., ECCE #0 to ECCE #(2N−1)) or (ii) a '4N' number of ECCEs (e.g., ECCE #0 to ECCE #(4N−1)), according to a PRB size (e.g., an N value corresponding to the number of PRBs) associated with one EPDCCH set, a type of a downlink subframe in which a corresponding EPDCCH set is configured, a length of a cyclic prefix (CP), and so forth. Hereinafter, a total number of ECCEs may be referred to as '$N_{ECCE}$'. The expression "ECCE #" denotes an index of a corresponding ECCE.

Figure 8:
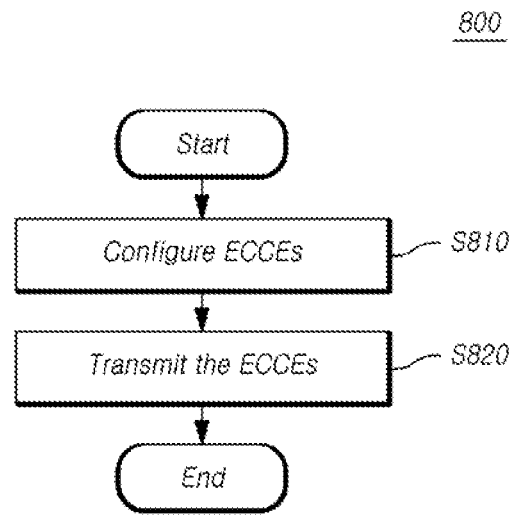
FIG. 8 is a flowchart illustrating a method of configuring 'a downlink control channel located in a data region' in an EPDCCH UE-specific search space in a transmission/reception point in accordance with at least one embodiment.

FIG. 8 is a flowchart illustrating a method of configuring 'a downlink control channel located in a data region' in an EPDCCH UE-specific search space in a transmission/reception point in accordance with at least one embodiment.

Referring to FIG. 8, the transmission/reception point may perform a method (800) of configuring 'the downlink control channel located in the data region' in the EPDCCH UE-specific search space in accordance with at least one embodiment. More specifically, the method (800) may include (i) configuring (or defining) ECCEs corresponding to a basic transmission unit of an EPDCCH, in an EPDCCH UE-specific search space, at step S810, and (ii) transmitting the ECCEs configured (or defined) in the EPDCCH UE-specific search space through the EPDCCH, to user equipment, at step S820.

More specifically, at step S810, the transmission/reception point may define (or form) ECCEs corresponding to a basic transmission unit of an EPDCCH, in an EPDCCH UE-specific search space. Herein, the EPDCCH may be located in the data region of an N number of resource-block pairs (e.g., PRB pairs) forming each of a K number of EPDCCH sets in a subframe. Each EPDCCH set may include an N number of resource-block pairs (e.g., PRB pairs). The K and N may be natural numbers which are greater than or equal to "1". As described above, each PRB pair may include 16 EREGs, and each ECCE may include 4 or 8 EREGs.

Referring back to step S810, the transmission/reception point may determine a search space starting offset (referred to herein as "an ECCE starting offset"), using one of (i) an implicit configuration scheme, (ii) an explicit configuration scheme, and (iii) a hybrid configuration scheme. Hereinafter, each of the configuration schemes will be described in more detail. For example, in the case of the implicit configuration scheme, the transmission/reception point may define (or form) ECCEs in an EPDCCH UE-specific search space, using a function of (i) a radio network temporary identifier (RNTI) of user equipment, (ii) a subframe index, (iii) an aggregation level, and (iv) a total number of ECCEs included in one EPDCCH set.

In an operation (S810) of forming (or defining) ECCEs, ECCEs may be formed (or defined) to be contiguous in as many as the number of monitoring operations to be performed based on a corresponding aggregation level, in a unit of an aggregation level (i.e., in a unit of the number of ECCEs corresponding to an aggregation level). Alternatively, ECCEs may be formed to be non-contiguous in a unit of an aggregation level. Particularly, in the case of a distributed EPDCCH set and/or a localized EPDCCH set, ECCEs may be contiguous. Meanwhile, in the case of a distributed EPDCCH set and/or a localized EPDCCH set, ECCEs may be non-contiguous. Herein, the terms "contiguous" and "non-contiguous" may not necessarily mean "physically contiguous" and "physically non-contiguous." That is, such terms may be a concept including 'logically' contiguous/non-contiguous and 'physically' contiguous/non-contiguous.

As described later, an ECCE hopping value associated with non-contiguous ECCEs may be determined by a function of (i) a total number of ECCEs of a corresponding EPDCCH set, (ii) an aggregation level, and (iii) the number of 'EPDCCH candidates' (i.e., EPDCCH monitoring candidates) to be monitored based on a corresponding aggregation level by user equipment.

Meanwhile, in the case that the user equipment is configured to have a carrier indicator field, a value of the carrier indicator field may be applied to a function defining the ECCE.

In addition, a transmission type of an EPDCCH set may correspond to one of a localized EPDCCH transmission and a distributed EPDCCH transmission. The aggregation level may be selected as one of 1, 2, 4, 8, 16, and 32. For normal subframes and normal CP when the number of REs for possible EPDCCH transmission is less than a threshold value ($X_{thresh}$), and for special subframes with special subframe configuration 3, 4, or 8 and normal CP when the number of REs for possible EPDCCH transmission is less than a threshold value ($X_{thresh}$) (hereinafter referred to as "Case 1"), a localized EPDCCH set may be defined to support aggregation levels 2, 4, 8, and 16, and a distributed EPDCCH may be defined to support aggregation levels 2, 4, 8, 16, and 32. Otherwise (hereinafter referred to as "Case 2"), a localized EPDCCH set may be defined to support aggregation levels 1, 2, 4 and 8, and a distributed EPDCCH may be defined to support aggregation levels 1, 2, 4, 8, and 16.

At step S820, the transmission/reception point may transmit the ECCEs formed (or defined) in the EPDCCH UE-specific search space, through an EPDCCH to the user equipment.

Hitherto, a method of configuring 'a downlink control channel located in a data region' in an EPDCCH UE-specific search space, in a transmission/reception point in accordance with at least one embodiment was described with reference to FIG. 8. Hereinafter, embodiments associated with a method of determining a search space starting offset ("an ECCE starting offset") in an operation (S810) of configuring ECCEs and a method of determining ECCE indices for a follow-up blind decoding attempt are described in more detail.

<1. Search Space Starting Offset (ECCE Starting Offset)>

Embodiment 1: Explicit Configuration

In the case of forming an EPDCCH set for a given user equipment, a value of a search space starting offset for blind decoding by the user equipment in a corresponding EPDCCH set may be signaled by a higher layer. In other words, in the case of forming an EPDCCH set for an EPDCCH user equipment, an ECCE starting offset value may be signaled by dynamic or higher-layer signaling (e.g., higher-layer RRC signaling) for forming a corresponding EPDCCH set. That is, the ECCE starting offset value may be included in a radio resource control (RRC) message. Furthermore, in this case, the ECCE starting offset value may be signaled, along with (i) configuration information of a group of PRBs (i.e., an N number of PRBs) forming the EPDCCH set and (ii) transmission type information (e.g., a localized type or a distributed type) of the EPDCCH set. Herein, the ECCE starting offset value may indicate a starting ECCE to be monitored per aggregation level by the user equipment, among the '2N' number of ECCSs or the '4N' number of ECCSs forming the corresponding EPDCCH set.

In this case, a blind decoding procedure of a corresponding user equipment may be performed from ECCE indices corresponding to ECCE starting offset values determined in all EPDCCH monitoring subframes.

Figure 9:
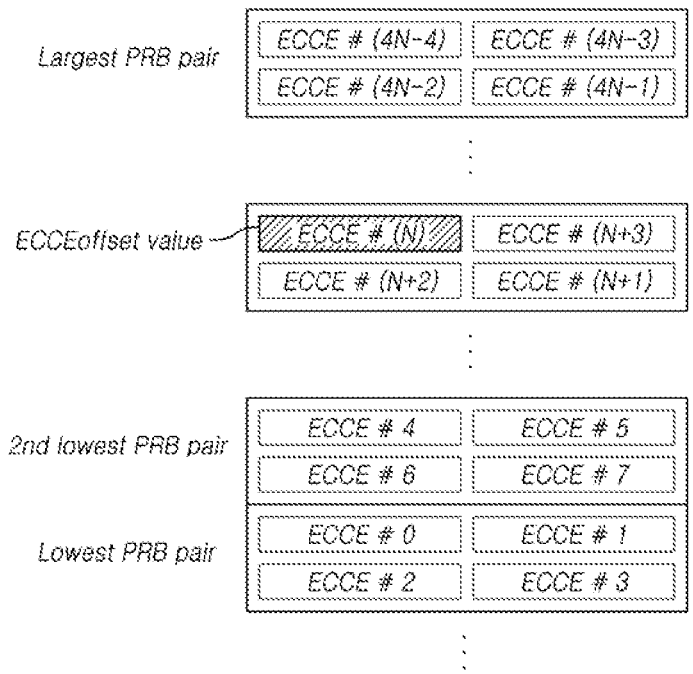
FIG. 9 illustrates determining an ECCE starting offset value in a method of configuring 'a downlink control channel located in a data region' in an EPDCCH UE-specific search space in a transmission/reception point in accordance with at least one embodiment.

In an example ("a first example") of determining an ECCE starting offset value, when an EPDCCH set is configured, one ECCE starting offset value ($ECCE_{offset}$) to be applied to all aggregation levels supported by a corresponding EPDCCH set may be determined, and be transmitted to a corresponding user equipment by higher-layer signaling. In this case, the user equipment may apply an identical ECCE starting offset value to all aggregation levels defined for a blind decoding in a corresponding EPDCCH set. That is, in the case that a certain EPDCCH set is configured with an 2N number of ECCEs or an 4N number of ECCEs, $ECCE_{offset}$ may be determined as 'N' and signaled, as described in FIG. 9 (in the case of $N_{ECCE}$=4N). Herein, the 2N number of ECCEs may include ECCE #0 to ECCE #(2N-1), and the 4N number of ECCEs may include ECCE #0 to ECCE #(4N-1). In this case, a corresponding user equipment may apply an identical $ECCE_{offset}$ (e.g., ECCE #N) to all aggregation levels (ALs) defined for a blind decoding in a corresponding EPDCCH set. Accordingly, in this case, the blind decoding may start from ECCE #N at all aggregation levels (ALs).

In another example ("a second example") of determining an ECCE starting offset value, the ECCE starting offset value may be separately determined per aggregation level (AL) supported by a corresponding EPDCCH set, and be transmitted to a corresponding user equipment by higher-layer signaling. In other words, in the case that a certain EPDCCH set is formed to support an X number of aggregation levels, ECCE starting offset values may be differently determined per aggregation level (AL), and be transmitted to a corresponding user equipment by higher-layer signaling. Herein, different ECCE starting offset values determined per aggregation level may be expressed as $ECCE_{offset,\ 1}$, $ECCE_{offset,\ 2}$, . . . , and $ECCE_{offset,\ x}$. In this case, a corresponding user equipment may apply a different ECCE starting offset value (i.e., an ECCE starting offset value separately determined per aggregation level) to each aggregation level (AL) defined for a blind decoding in a corresponding EPDCCH set. Accordingly, in this case, the blind decoding may start from an ECCE index corresponding to an ECCE starting offset value separately determined per aggregation level (AL).

For example, in the case of forming a localized EPDCCH set, if aggregation levels (ALs) associated with a blind decoding of user equipment are defined as 1, 2, and 4, three ECCE starting offset values (e.g., $ECCE_{offset,\ 1}$, $ECCE_{offset,\ 2}$, and $ECCE_{offset,\ 3}$) for the user equipment may be determined. Accordingly, in the case of aggregation level (AL) 1, a blind decoding performed by a corresponding user equipment may start from an ECCE index corresponding to $ECCE_{offset,\ 1}$. Similarly, in the case of aggregation level (AL) 2, a corresponding blind decoding performed by the corresponding user equipment may start from an ECCE index corresponding to $ECCE_{offset,\ 2}$. In the case of aggregation level (AL) 4, a corresponding blind decoding performed by the corresponding user equipment may start from an ECCE index corresponding to $ECCE_{offset,\ 3}$.

Embodiment 2: Implicit Configuration

Typically, a UE-specific search space (USS) may be defined per aggregation level of user equipment in a legacy (or typical) PDCCH. A starting offset of ECCE indices where a blind decoding is performed by a corresponding user equipment in an EPDCCH set formed per user equipment may be defined in a similar manner to the typical scheme. More specifically, the starting offset of ECCE indices may be defined as a function of (i) RNTI of the corresponding user equipment, (ii) a subframe index (e.g., $k=\lfloor n_s/2 \rfloor$, where $n_s$ is a slot index (i.e., the slot number within a radio frame)), (iii) an aggregation level (AL), and (iv) a size of a corresponding EPDCCH set (i.e., the number of ECCEs ("$N_{ECCE}$"), for example, 2N or 4N).

In more detail, a search space starting offset (i.e., an ECCE starting offset) may indicate a position from which a blind decoding of a corresponding user equipment starts in a certain EPDCCH set formed for the user equipment. The search space starting offset (i.e., ECCE starting offset) may be defined as a function of the above-described parameters. For example, the search space starting offset may be defined by Formula 2 below.

$$ECCE_{offset}=f(RNTI, \text{subframe index}, AL, N_{ECCE}) \quad \text{[Formula 2]}$$

In Formula 2, $N_{ECCE}$ denotes a total of ECCEs. Furthermore, $N_{ECCE}$ may be determined based on 'a PRB size associated with a corresponding EPDCCH set' (i.e., an N value, for example, the number of PRBs forming one EPDCCH set) and 'the number of EREGs forming one ECCE' ("M").

In at least one embodiment, a function of determining UE-specific PDCCH monitoring candidates in a legacy PDCCH, i.e., a function defined by Formula 1 above may be reused. However, in this case, 2N or 4N corresponding to a total number of ECCEs ("$N_{ECCE}$") of a corresponding EPDCCH set may be applied in place of a total number of CCEs ("$N_{CCE, k}$") according to a PDCCH size in a corresponding subframe.

Embodiment 3: Hybrid Configuration

A method of determining an ECCE starting offset according to Embodiment 3 may correspond to a hybrid type combining an implicit configuration and an explicit configuration. First, an ECCE starting offset value per EPDCCH set may be determined by a method of determining an ECCE starting offset according to Embodiment 1, and be transmitted to a corresponding user equipment by higher-layer signaling. However, the user equipment may use a different ECCE starting offset (i.e., an ECCE starting offset different from the ECCE starting offset value signaled by a higher layer) based on an index of a downlink subframe in which a corresponding EPDCCH is transmitted. In other words, an ECCE starting offset value to be used by a corresponding user equipment in a corresponding EPDCCH set may be determined based on a function of (i) 'the ECCE starting offset value determined for the corresponding user equipment by higher-layer signaling' (referred to herein as "ECCE starting offset value by explicit signaling") and (ii) the downlink subframe index. Accordingly, an identical ECCE starting offset value may not be applied to all downlink subframes in which an EPDCCH is transmitted. That is, the user equipment may always provide a corresponding diversity effect to the same search space, by performing an ECCE starting offset value hopping per downlink subframe.

Alternatively, a search space starting offset value (i.e., ECCE starting offset value) to be actually applied may be obtained based on such parameters as (i) an ECCE starting offset value by explicit signaling, (ii) a downlink subframe index, and (iii) RNTI of a corresponding user equipment. In other words, an EPDCCH search space to be monitored by user equipment may be determined based on a function of (i) a search space starting offset value determined by higher-layer signaling (i.e., an ECCE starting offset value determined by explicit signaling), (ii) a downlink subframe index, and (iii) RNTI of a corresponding user equipment. Herein, the EPDCCH search space may represent a search space to be monitored by a corresponding user equipment, in a certain EPDCCH set formed for the corresponding user equipment in an EPDCCH monitoring downlink subframe. Alternatively, a search space starting offset (i.e., an ECCE starting offset) to be monitored may be determined based on a function of (i) a signaling parameter (e.g., a search space starting offset value determined by higher-layer signaling), (ii) a downlink subframe index, and (iii) a size of an EPDCCH set.

Hitherto, methods of determining a search space starting offset (i.e., ECCE starting offset) were described according to Embodiment 1 to Embodiment 3. Hereinafter, embodiments associated with a method of determining an ECCE index for a follow-up blind decoding attempt will be described in more detail.

<2. ECCE Hopping>

A given EPDCCH user equipment may perform a blind decoding, from an ECCE index corresponding to an ECCE starting offset value. Herein, the ECCE starting offset value may be determined per aggregation level (AL) according to Embodiment 1 to Embodiment 3 described above. The aggregation level (AL) may be defined for a blind decoding in an EPDCCH set formed for a corresponding user equipment. Meanwhile, the number of blind decodings to be performed at a certain aggregation level (AL) may be plural. That is, the number of EPDCCH candidates (i.e., EPDCCH monitoring candidates) to be monitored by a corresponding user equipment at the certain aggregation level (AL) may be plural. In this case, ECCE indices at which a follow-up blind decoding is performed after a first blind decoding attempt might be required to be defined. Herein, the first blind decoding attempt is associated with an ECCE starting offset described above.

The present embodiment may provide a method of determining an ECCE index (or ECCE indices) for a follow-up blind decoding attempt. More specifically, the present embodiment may provide a method of sequentially performing a blind decoding of contiguous ECCEs and a method of performing an ECCE hopping according to a blind decoding attempt.

Embodiment 4: Continuous ECCEs

According to Embodiment 4, a blind decoding of contiguous ECCEs may be sequentially performed. As described above, an ECCE starting offset value per aggregation level in a corresponding EPDCCH set of an EPDCCH monitoring downlink subframe formed for a given user equipment may be determined according to Embodiment 1 to Embodiment 3. When the ECCE starting offset value is determined according to Embodiment 1 to Embodiment 3, a method of sequentially performing a blind decoding of contiguous ECCEs according to Embodiment 4 described above may be applied. More specifically, when the ECCE starting offset value is determined according to Embodiment 1 to Embodiment 3, user equipment may perform an EPDCCH monitoring (i.e., a blind decoding) for an L*T number of contiguous ECCEs in an EPDCCH set. Herein, L denotes a size of corresponding aggregation level (AL), and T denotes the determined number of blind decodings. The L*T number of contiguous ECCEs may start from a corresponding ECCE starting offset value. Particularly, the EPDCCH monitoring for an L*T number of contiguous ECCEs may be performed in a unit of 'L' CCEs (i.e., in a unit of an L number of CCEs). In other words, in the case that the number of blind decodings performed based on a corresponding aggregation level (having a size of I') supported by a corresponding EPDCCH set is set to 'T', and an ECCE starting offset value determined according to Embodiment 1 to Embodiment 3 is $offset_L$, a corresponding user equipment may perform a blind decoding of ECCEs corresponding to ECCE #$offset_L$ through to ECCE #($offset_L$+L*T−1). Particularly, in this case, the blind decoding may be performed in a unit of an L number of ECCEs.

For example, a certain localized EPDCCH set for a given user equipment may be configured with consecutive 8 PRBs. In the case that the number of EREGs forming one ECCE is '4' according to a criteria described above, the localized EPDCCH set may be configured with a total of 32(=8×4) ECCEs. Furthermore, in the case that the number of blind decodings to be performed by a corresponding user equipment at aggregation level (AL) 2 in a corresponding EPD- CCH set is defined as '6', and an ECCE start offset value is '16', the user equipment may blindly decode ECCE #16 and ECCE #17 first. Thereafter, the user equipment may continue to blindly decode (i) ECCE #18 and ECCE #19, (ii) ECCE #20 and ECCE #21, (iii) ECCE #22 and ECCE #23, (iv) ECCE #24 and ECCE #25, and (v) ECCE #26 and ECCE #27.

However, in this case, if a value of corresponding (offset$_L$+L*T) exceeds a total number of ECCEs ('N$_{ECCE}$'=2N or 4N) forming a corresponding EPDCCH set, a corresponding blind decoding may be cyclically performed from "ECCE #0" corresponding to a search space to be performed by a corresponding user equipment. In other words, a search space configured with an (offset$_L$+L*T−N$_{ECCE}$) number of ECCEs may be defined as ECCE #0 to ECCE #(offset$_L$+L*T−N$_{ECCE}$−1).

Embodiment 5: ECCE Hopping

According to another method of forming a search space for blind decoding by user equipment, 'EPDCCH monitoring candidates' (referred to herein as "EPDCCH candidates") to which a follow-up blind decoding is applied may be determined (or defined) per aggregation level (AL) in an EPDCCH set. Herein, the follow-up blind decoding may represent a next blind decoding to be continuously performed, after ECCEs associated with an ECCE starting offset are blindly decoded. The ECCE starting offset may be determined according to Embodiment 1 to Embodiment 3 described above. Particularly, the EPDCCH monitoring candidates associated with the follow-up blind decoding may be determined by hopping a constant number of ECCEs. In other words, in the case that the number of blind decodings (i.e., the number of 'EPDCCH monitoring candidates') to be performed based on a corresponding aggregation level (having a size of 'L') supported by a corresponding EPDCCH set is set to 'T', and an ECCE starting offset value is determined as offset$_L$, ECCE indices forming an T number of EPDCCH search spaces based on a corresponding aggregation level (AL) may be defined using an ECCH hopping parameter ("H") as below.

(p+1)$^{th}$ search space at aggregation level ("L"):
ECCE #(offset$_L$+p*H) to ECCE #(offset$_L$+p*H+L−1),for p=0,1,2, . . . ,T−1 [Formula 3]

That is, after a first search space is blindly decoded, a second search space including ECCE #(offset$_L$+H) to ECCE #(offset$_L$+H+L−1) may be blindly decoded. Herein, the second search space may be determined according to an ECCE hopping value ("H"). In addition, each of an T number of search spaces including {ECCE #(offset$_L$+2H) to ECCE #(offset$_L$+2H+L−1)}, . . . , {ECCE #(offset$_L$+(T−1)H) to ECCE #(offset$_L$+(T−1)H+L−1)} may be blindly decoded. In this case, if an ECCE index value forming a certain (n+1)$^{th}$ search space (i.e., when p=n) exceeds 'the total number of ECCEs' (i.e., N$_{ECCE}$) forming a corresponding EPDCCH set, a corresponding decoding procedure may cyclically return to ECCE #0 corresponding to a first ECCE of the corresponding EPDCCH set, like the case of contiguous ECCEs described in Embodiment 4. Accordingly, in this case, a corresponding search space (i.e., the (n+1)$^{th}$ search space) may be assigned from ECCE #0.

However, in the case that a cyclic shift is applied to determine 'EPDCCH monitoring candidates,' an overlapping between (i) ECCEs forming '(n+1)$^{th}$ EPDCCH monitoring candidate' and 'corresponding follow-up EPDCCH monitoring candidates' and (ii) ECCEs forming 'previous EPDCCH monitoring candidates' of '(n+1)$^{th}$ EPDCCH monitoring candidate (i.e., when p=n)' might occur. Accordingly, an EPDCCH monitoring candidate set may be determined by performing an ECCE shifting as much as 'a size of a corresponding aggregation level' ("L") such that the overlapping is prevented. In other words, if offset$_L$+n*H>N$_{ECCE}$ (for p=n) in Formula 3 above, a search space for p=n may be defined by Formula 4 below.

(p+1)$^{th}$ search space at aggregation level ("L"):
ECCE #(offset$_L$+p*H−N$_{ECCE}$+L) to
ECCE #(offset$_L$+p*H−N$_{ECCE}$+2L−1),for p=n [Formula 4]

In Formula 4, n=0, 1, 2, . . . , T−1, and offset$_L$+n*H≥N$_{ECCE}$.

In generalizing the above description in the case of p=n, an 'm' number of ECCE cyclic shifts may be performed for corresponding search spaces. Accordingly, the corresponding search spaces may be shifted by 'mL', through the ECCE cyclic shifts. That is, if offset$_L$+n*H≥mN$_{ECCE}$ in Formula 3 above, a search space for p=n may be defined by Formula 5 below.

(p+1)$^{th}$ search space for aggregation level ("L"):
ECCE #(offset$_L$+p*H−mN$_{ECCE}$+mL) to
ECCE #(offset$_L$+p*H−mN$_{ECCE}$+mL+L−1),for p=n [Formula 5]

In Formula 5, n=0, 1, 2, . . . , T−1, and offset$_L$+n*H≥mN$_{ECCE}$ (m=0, 1, 2, 3, . . . ).

Alternatively, in the case that a cyclic shifting is applied, an ECCE shifting as much as 'a size of an aggregation level' (L) needs not to be performed unconditionally. In other words, only if an overlapping with ECCEs corresponding to the previous EPDCCH monitoring candidates occurs, an ECCE shifting may be performed as much as 'a size of an aggregation level' (L).

A method of determining an ECCE hopping value ("H") may be performed in a same manner as in an explicit configuration (or determination) method of a search space starting offset according to Embodiment 2. More specifically, in the case of forming an EPDCCH set, a corresponding ECCE hopping value ("H") may be transmitted to user equipment by higher-layer signaling. Like this, in the case that the corresponding ECCE hopping value ("H") is included in a higher-layer signaling parameter for an EPDCCH set configuration, a single H value may be determined per EPDCCH set. Accordingly, in this case, an identical H value may be applied to all aggregation levels defined in a corresponding EPDCCH set. Alternatively, an H value may be separately determined per aggregation level (AL) defined in a corresponding EPDCCH set, and be signaled by a higher layer.

In other embodiments, a corresponding H value (i.e., a corresponding hopping value) may be implicitly determined based on (i) a size of one corresponding EPDCCH set, (ii) the number of EREGs forming one ECCE described above, and/or (iii) an aggregation level (AL) size, and is not limited thereto. For example, an H value may be determined as the largest value of (i) N$_{ECCE}$, i.e., the number of ECCEs included in one PRB and (ii) an aggregation level (AL) size ("L"). Herein, in the case that the number of EREGs forming one ECCE is referred to as "E", the number of ECCEs (i.e., N$_{ECCE}$) included in one PRB may correspond to '16/E'. That is, an H value may be determined by $$H = \max\left(\frac{16}{E}, L\right).$$

Herein, in the case of (i) a normal subframe with a normal CP, and (ii) special subframes with special subframe configuration 3, 4, or 8 and a normal CP, the 'E' value may be 4 (E=4). In the case of (i) special subframes with special subframe configuration 1, 2, 6, 7, or 9 and a normal CP, (ii) a normal subframe with an extended CP, and (iii) special subframes with special subframe configuration 1, 2, 3, 5, or 6 and an extended CP, the 'E' value may be 8 (E=8).

In other embodiment, a corresponding H value (i.e., a corresponding hopping value) may be implicitly determined by a function including at least one of (i) a size of one corresponding EPDCCH set (e.g., an N value, when one EPDCCH set is configured with a group of 'N' PRBs), (ii) a T value, i.e., the number of blind decodings (i.e., the number of EPDCCH monitoring candidates) to be performed based on a corresponding aggregation level (having a size of 'L') in a corresponding EPDCCH set, (iii) an aggregation level (AL) size ("L"), and (iv) an E value, i.e., the number of EREGs forming one ECCE. For example, an ECCE hopping value of non-contiguous ECCEs may be determined using a function of a total number of ECCEs of a corresponding EPDCCH set, an aggregation level, and/or the number of EPDCCH candidates monitored by user equipment based on a corresponding aggregation level, and is not limited thereto. More specifically, an ECCE hopping value of non-contiguous ECCEs may be determined by a function of an operation value, when [a total number of ECCEs of a corresponding EPDCCH set] is divided by the product of [an aggregation level] and [the number of EPDCCH candidates monitored by user equipment based on a corresponding aggregation level].

In this case, a corresponding ECCE hopping value ("H") may be determined by Formula 6 or Formula 7 below. Herein, [x] denotes a maximum integer not exceeding x.

$$H=\max(a \cdot b, L), \text{ where } a=\max(1,[N/T]) \text{ and } b=16/E \quad \text{[Formula 6]}$$

$$H=\max(a \cdot b, L), \text{ where } a=[N/T] \text{ and } b=16/E \quad \text{[Formula 7]}$$

'H=max' (or a hopping parameter) may be signaled by a higher layer when an EPDCCH set is configured. Herein, 'H=max' may be simply referred to as "h". Meanwhile, an ECCE hopping value ("H") to be actually applied may be determined by a function of 'a signaled hopping parameter ("h")' and/or other implicit parameters (e.g., an aggregation level size (L), an EPDCCH set size (N or $N_{ECCE}$ (=2N or 4N)), etc.). For example, a hybrid configuration method of determining a hopping value (e.g., H=max(h, L)) per aggregation level (AG), according to an 'h' value signaled for a corresponding user equipment may be included in a scope of the present embodiment.

In other embodiments, in the case of user equipment in which a cross carrier scheduling is activated among carrier aggregation (CA) user equipment, a search space starting offset value (i.e., an ECCE starting offset value) described above may be separately assigned (or determined) per corresponding component carrier (CC). In other words, different search space starting offset values may be signaled per component carrier (CC). In another embodiment, a carrier index value per component carrier (CC) may be applied to an above-described function of creating (or determining) a search space starting offset value. Herein, the carrier index value may correspond to a value applied to a carrier indicator field (CIF) of a scheduling grant. Alternatively, in the case of monitoring an EPDCCH (i.e., in the case of performing a blind decoding based on a certain aggregation level (AL) in an EPDCCH set), a search space may be contiguously configured or be configured through an ECCE hopping, according to Embodiment 4 or Embodiment 5 described above. Particularly, in these cases, a search space of a primary cell ($P_{cell}$) and a search space of a secondary cell ($S_{cell}$) may be employed in increasing order of CIF. In other words, after a search space of a primary cell ($P_{cell}$) is employed, a search space of a secondary cell ($S_{cell}$) may be employed.

In the present embodiment, an EPDCCH monitoring candidate (i.e., a search space) may be determined for user equipment performing an EPDCCH monitoring operation (i.e., a blind decoding) in an EPDCCH set, as described above. Particularly, in the present embodiment, all EPDCCH monitoring candidate determination methods (i.e., all search space determination methods) may be applied which can be embodied by combining (i) at least one of Embodiment 1 to Embodiment 3 and (ii) at least one of Embodiment 4 and Embodiment 5.

In other embodiments, (i) a search space starting offset value (i.e., an ECCE starting offset value) may be directly and explicitly signaled by a higher layer, or (ii) a parameter used to determine a search space starting offset value according to a hybrid configuration scheme may be signaled by a higher layer. In this case, an ECCE hopping value ("H") and/or related parameters may be further signaled. In other words, both 'an ECCE starting offset parameter' and 'an ECCE hopping related parameter' corresponding to a search space configuration parameter for a given user equipment in an EPDCCH set may be signaled. In this case, after a configuration table for a parameter determination is defined, a configuration index to be applied per EPDCCH set may be signaled. A search space configuration table may be defined per EPDCCH type. Accordingly, the search space configuration table may include (i) a configuration table for a localized EPDCCH set and (ii) a configuration table for a distributed EPDCCH set. Alternatively, a search space configuration table may be defined based on (i) a size of an EPDCCH set, or (ii) the number of EREGs forming one ECCE. Particularly, in the case that a search space configuration table is defined based on 'the number of EREGs' ("E"), two search space configuration tables (e.g., configuration tables for E=4 and E=8) may be defined. All embodiments associated with a search space mapping based on a configuration table are included in a scope of the present embodiment.

In the case that user equipment is configured to receive downlink control information (DCI) through an EPDCCH, the present embodiment may provide a method for receiving the DCI.

Figure 10:
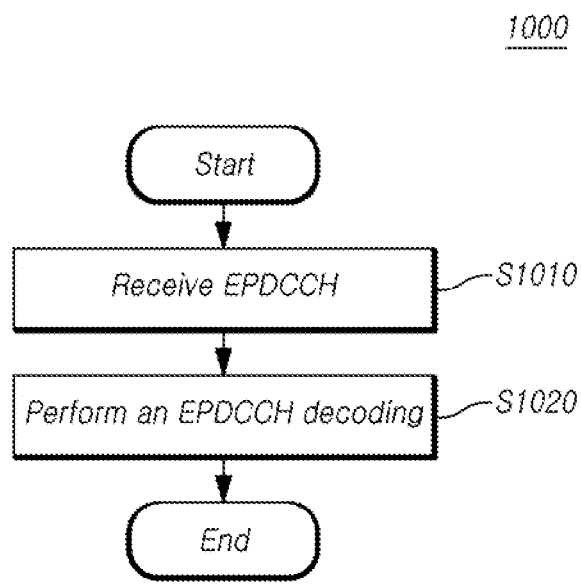
FIG. 10 is a flowchart illustrating a method of receiving a downlink control channel located in a data region in a user equipment in accordance with other embodiments.

FIG. 10 is a flowchart illustrating a method of receiving a downlink control channel located in a data region, in a user equipment in accordance with other embodiments.

Referring to FIG. 10, the user equipment may perform a method (1000) of receiving a downlink control channel located in a data region. More specifically, at step S1010, the user equipment may receive an EPDCCH from a transmission/reception point, through the data region of an N number of resource-block pairs (e.g., PRB pairs) forming each of a K number of EPDCCH sets in a subframe. Herein, the K and N are natural numbers which are greater than or equal to "1". At step S1020, the user equipment may perform may decode the EPDCCH in each EPDCCH set according to a downlink control information (DCI) format in an EPDCCH UE-specific search space.

As described above, each PRB pair may include 16 enhanced resource element groups (EREGs). Each enhanced control channel element (ECCE) corresponding to a basic unit of an EPDCCH transmission may include 4 or 8 EREGs.

More specifically, at step S1020, the user equipment may decode the EPDCCH in each EPDCCH set according to the downlink control information (DCI) format, in the EPDCCH UE-specific search space. In this case, ECCEs associated with the EPDCCH decoding may be formed (or defined) by using one of (i) an explicit configuration scheme, (ii) an implicit configuration scheme, and (iii) a hybrid configuration scheme, as described above according to Embodiment 1 to Embodiment 3. For example, in the case of the implicit configuration scheme, the ECCEs may be formed (or defined) by a function of (i) a radio network temporary identifier (RNTI) of user equipment, (ii) a subframe index, (iii) an aggregation level, and/or (iv) a total number of ECCEs included in one EPDCCH set. As described above, a starting offset of ECCE indices where a blind decoding is performed by a corresponding user equipment in an EPDCCH set may be defined as a function of (i) RNTI of the corresponding user equipment, (ii) a subframe index (e.g., $k=\lfloor n_s/2 \rfloor$, where $n_s$ is a slot index), (iii) an aggregation level (AL), and (iv) a size of a corresponding EPDCCH set (i.e., the number of ECCEs ("$N_{ECCE}$"), for example, 2N or 4N). Herein, the EPDCCH set may be formed per user equipment.

In more detail, a search space starting offset (i.e., ECCE starting offset) may indicate a position from which a blind decoding of corresponding user equipment starts in a certain EPDCCH set formed for the user equipment. The search space starting offset (i.e., ECCE starting offset) may be defined as a function of the above-described parameters. For example, the search space starting offset may be defined by $ECCE_{offset}=f(RNTI, \text{subframe index}, AL, N_{ECCE})$.

A function defined by Formula 1 above, i.e., a function of determining 'UE-specific PDCCH monitoring candidates' in a legacy PDCCH may be reused. However, in this case, as described above, 2N or 4N corresponding to a total number of ECCEs ("$N_{ECCE}$") of a corresponding EPDCCH set may be applied to Formula 1 above, in place of a total number of CCEs ("$N_{CCE, k}$") according to a PDCCH size in a corresponding subframe.

Meanwhile, in an operation (S1020) of decoding an EPDCCH, user equipment may monitor as many contiguous ECCEs as the number of monitoring operations to be performed based on a corresponding aggregation level in a unit of aggregation level. As described above, an ECCE starting offset value per aggregation level in a corresponding EPDCCH set of an 'EPDCCH monitoring downlink subframe' formed for a given user equipment may be determined according to Embodiment 1 to Embodiment 3. When the ECCE starting offset value is determined according to Embodiment 1 to Embodiment 3, a method of sequentially performing a blind decoding of contiguous ECCEs according to Embodiment 4 described above may be applied. More specifically, when the ECCE starting offset value is determined according to Embodiment 1 to Embodiment 3, user equipment may perform an EPDCCH monitoring operation (i.e., a blind decoding) for an L*T number of contiguous ECCEs in an EPDCCH set. Herein, L denotes a size of a corresponding aggregation level (AL), and T denotes the determined number of blind decodings. The L*T number of contiguous ECCEs may start from a corresponding ECCE starting offset value. Particularly, the EPDCCH monitoring operation for an L*T number of contiguous ECCEs may be performed in a unit of an 'L' number of CCEs.

Meanwhile, in an operation (S1020) of decoding an EPDCCH, user equipment may monitor non-contiguous ECCEs in a unit of an aggregation level (i.e., in a unit of the number of ECCEs corresponding to an aggregation level), as described in Embodiment 5. In this case, an ECCE hopping value of non-contiguous ECCEs may be determined by a function of (i) a total number of ECCEs included in a corresponding EPDCCH set, (ii) an aggregation level, and (iii) the number of EPDCCH candidates monitored by the user equipment, based on a corresponding aggregation level. As described above, according to another method of forming a search space to be blindly decoded by the user equipment, 'EPDCCH monitoring candidates' to which a follow-up blind decoding is applied may be determined (or defined) per aggregation level (AL) in an EPDCCH set. Herein, the follow-up blind decoding may represent a next blind decoding to be continuously performed, after ECCEs corresponding to an ECCE starting offset is blindly decoded. The ECCE starting offset may be determined according to Embodiment 1 to Embodiment 3 described above. Particularly, the EPDCCH monitoring candidates associated with the follow-up blind decoding may be determined by hopping a constant number of ECCEs. As described above, according to still another method of implicitly determining a search space, the search space may be determined by a function of (i) a 'N' value, i.e., a size of a corresponding EPDCCH set (in the case that one EPDCCH set is configured with a group of 'N' PRBs), (ii) a 'T' value, i.e., the number of blind decodings (i.e., the number of EPDCCH monitoring candidates) at an aggregation level (AL) to perform a blind decoding in a certain EPDCCH set, (iii) an 'L' value, i.e., a size of an aggregation level, and/or (iv) an 'E' value, i.e., the number of EREGs forming one ECCE.

Meanwhile, in the case that user equipment is configured to have a carrier indicator field (CIF), a value of the carrier indicator field (CIF) is applied to a function defining the ECCEs to be blindly decoded. A carrier index (CI) value per component carrier (CC) may be applied to a function of creating an offset value. Herein, the carrier index (CI) value may be a value which is applied to a carrier indicator field (CIF) of a scheduling grant.

Meanwhile, an EPDCCH set may be formed for one of a localized EPDCCH transmission and a distributed EPDCCH transmission. An aggregation level may correspond to one of 1, 2, 4, 8, 16, and 32. Furthermore, for normal subframes and normal CP when the number of REs for possible EPDCCH transmission is less than a threshold value ($X_{thresh}$), and for special subframes with special subframe configuration 3, 4, or 8 and normal CP when the number of REs for possible EPDCCH transmission is less than a threshold value ($X_{thresh}$) (hereinafter referred to as "Case 1"), a localized EPDCCH set may be defined to support aggregation levels 2, 4, 8, and 16, and a distributed EPDCCH may be defined to support aggregation levels 2, 4, 8, 16, and 32. Otherwise (hereinafter referred to as "Case 2"), a localized EPDCCH set may be defined to support aggregation levels 1, 2, 4 and 8, and a distributed EPDCCH may be defined to support aggregation levels 1, 2, 4, 8, and 16.

Figure 11:
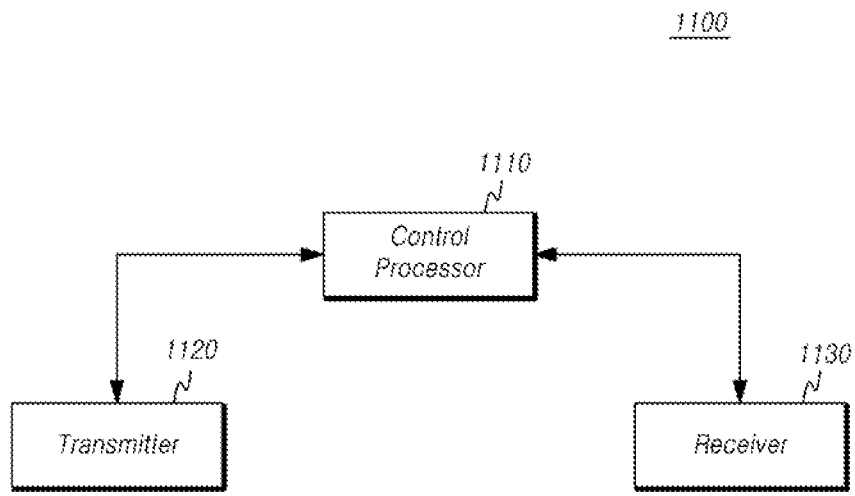
FIG. 11 is a diagram illustrating a base station in accordance with some embodiments.

FIG. 11 is a diagram illustrating a base station in accordance with some embodiments.

Referring to FIG. 11, base station 1100 according to at least one embodiment may include control processor 1110, transmitter 1120, and receiver 1130. Herein, base station 1100 may be a transmission/reception point for configuring 'a downlink control channel located in a data region' in an EPDCCH UE-specific search space.

Control processor 1110 may control operations (i.e., operations of base station 1100) which are required for performing the above-described present embodiments. More specifically, control processor 1110 may control operations (i.e., operations of base station 1100) associated with a blind decoding per aggregation level in an EPDCCH set formed for user equipment. Herein, the user equipment is configured to receive downlink control information (DCI) through an EPDCCH corresponding to a downlink control channel.

In more detail, control processor 1110 may form (or define) ECCEs corresponding to a basic transmission unit of an EPDCCH, in the EPDCCH UE-specific search space. Herein, the EPDCCH may be located in a data region of an N number of resource-block pairs (e.g., PRB pairs) forming each of a K number of EPDCCH sets in a subframe. The K and N are natural numbers which are greater than or equal to "1". As described above, each PRB pair may include 16 EREGs, and each ECCE may include 4 or 8 EREGs.

Furthermore, control processor 1110 may determine a search space starting offset (i.e., an ECCE starting offset) using one of (i) an implicit configuration scheme, (ii) an explicit configuration scheme, and (iii) a hybrid configuration scheme, as describe above. For example, in the case of the implicit configuration scheme, control processor 1110 may form (or define) ECCEs in the EPDCCH UE-specific search space, by using a function of a radio network temporary identifier (RNTI) of user equipment, an index of the subframe, an aggregation level, and a total number of ECCEs of each EPDCCH set.

Transmitter 1120 and receiver 1130 may respectively transmit and receive signals, messages, and/or data required for performing the above-described present embodiments, in connection with the user equipment. For example, transmitter 1120 may transmit the ECCEs formed (or defined) in the EPDCCH UE-specific search space, through an EPDCCH to user equipment.

Figure 12:
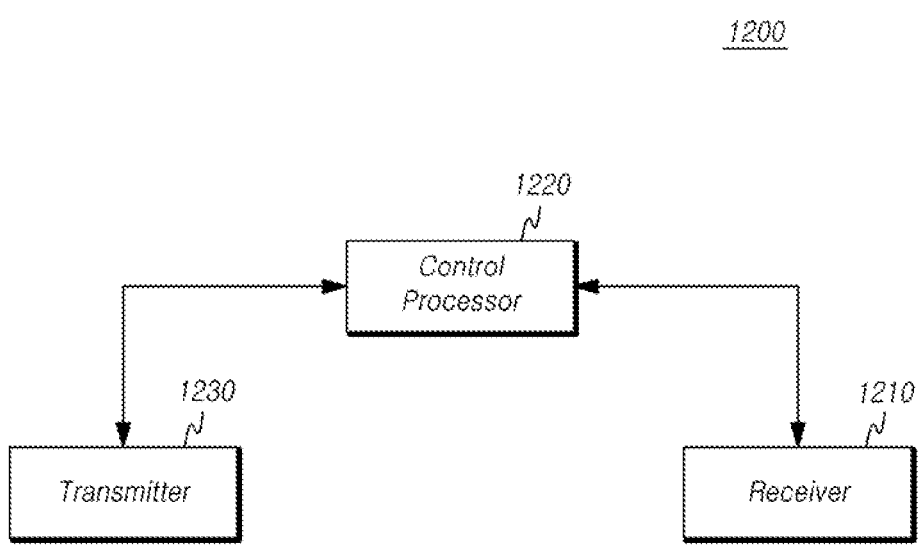
FIG. 12 is a diagram illustrating user equipment in accordance with some embodiments.

FIG. 12 is a diagram illustrating user equipment in accordance with some embodiments.

Referring to FIG. 12, user equipment 1200 according to the present embodiment may include receiver 1210, control processor 1220, and transmitter 1230.

Receiver 1210 may receive downlink control information, data, and/or messages through a corresponding channel from a base station (e.g., base station 1100). Herein, the base station may correspond to a transmission/reception point. More specifically, receiver 1210 may receive an EPDCCH from the base station, through the data region of an N number of PRB pairs forming each of a K number of EPDCCH sets in a subframe. Herein, the K and N may be natural numbers which are greater than or equal to "1".

Control processor 1220 may control operations (i.e., operations of user equipment 1200) which are required for performing the above-described present embodiments. More specifically, control processor 1210 may control operations (i.e., operations of user equipment 1200) associated with a blind decoding per aggregation level in an EPDCCH set formed for user equipment 1200. Herein, user equipment 1200 is configured to receive downlink control information (DCI) through an EPDCCH corresponding to a downlink control channel. Furthermore, control processor 1210 may decode an EPDCCH in each EPDCCH set according to a corresponding DCI format, in an EPDCCH UE-specific search space. In this case, ECCEs associated with the EPDCCH decoding in an EPDCCH UE-specific search space may be formed (or defined) by a function of (i) a radio network temporary identifier (RNTI) of the user equipment, (ii) a included in one EPDCCH set.

Transmitter 1230 may transmit control information, data, and/or messages through a corresponding channel, to the base station.

ECCEs may be contiguous or non-contiguous in connection with operations of base station 1100 or user equipment 1200. More specifically, ECCEs may be formed to be contiguous as many as the number of monitoring operations to be performed based on a corresponding aggregation level, in a unit of an aggregation level (i.e., in a unit of the number of ECCEs corresponding to an aggregation level). Alternatively, ECCEs may be formed to be non-contiguous in a unit of an aggregation level. Particularly, in the case of a distributed EPDCCH set and/or a localized EPDCCH set, ECCEs may be contiguous. Meanwhile, in the case of a distributed EPDCCH set and/or a localized EPDCCH set, ECCEs may be non-contiguous. As described above, an ECCE hopping value associated with non-contiguous ECCEs may be determined by a function of (i) a total number of ECCEs of a corresponding EPDCCH set, (ii) an aggregation level, and (iii) the number of EPDCCH candidates to be monitored based on a corresponding aggregation level by user equipment 1200. Meanwhile, in the case that user equipment 1200 is configured to have a carrier indicator field, a value of the carrier indicator field may be applied to 'a function defining the ECCE' (i.e., an ECCE defining function). In addition, a transmission type of an EPDCCH set may correspond to one of a localized EPDCCH transmission and a distributed EPDCCH transmission.

Although contents of technical standards referred to in the above-described embodiments are omitted for brief descriptions of the specification, the related contents of the technical standards may constitute a portion of the present specification. Accordingly, adding a portion of the standards-related content in the specification and/or the claims will be construed as being included in the scope of the present invention.

More specifically, the included documents may constitute a portion of the present specification as a portion of published documents. Accordingly, adding a portion of standards-related contents and/or standard documents in the description and/or the claims will be construed as being included in the scope of the present invention.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A method of receiving a downlink control channel located in a data region, in user equipment (UE), the method comprising:

receiving an enhanced physical downlink control channel (EPDCCH) from a transmission/reception point, wherein the EPDCCH includes a data region of one or more physical resource-block (PRB) pairs forming each of a plurality of EPDCCH sets in a subframe, and wherein (i) each PRB pair includes a plurality of enhanced resource element groups (EREGs), and (ii) an enhanced control channel element (ECCE) corresponding to a basic unit of an EPDCCH transmission includes a plurality of EREGs; and decoding the EPDCCH in a corresponding EPDCCH set according to a downlink control information (DCI) format in an EPDCCH UE-specific search space, wherein ECCEs monitored by the user equipment for the decoding of the EPDCCH are defined by a function of (i) a radio network temporary identifier (RNTI) of the user equipment, (ii) an index of the subframe, (iii) an aggregation level, and (iv) a total number of ECCEs of the corresponding EPDCCH set, wherein in the case that each PRB pair includes an M number of EREGs, the ECCE includes an M/4 number of EREGs or an M/2 number of EREGs, wherein the M is a natural number.

2. The method of claim 1, wherein the M is 16.

3. The method of claim 1, wherein the decoding the EPDCCH includes:

monitoring non-contiguous ECCEs in a unit of the number of ECCEs corresponding to the aggregation level.

4. The method of claim 3, wherein the decoding the EPDCCH includes:

determining an ECCE hopping value of the non-contiguous ECCEs, using a function of a total number of ECCEs of the corresponding EPDCCH set, the aggregation level, and the number of EPDCCH candidates monitored by the user equipment based on the aggregation level.

5. The method of claim 1, wherein in the case that the user equipment is configured with a carrier indicator field, a value of the carrier indicator field is applied to a function defining the ECCEs.

6. The method of claim 1, wherein each EPDCCH set is formed for one of a localized EPDCCH transmission and a distributed EPDCCH transmission.

7. The method of claim 6, wherein the aggregation level is determined based on at least one of a type of the EPDCCH transmission, a subframe type, a cyclic prefix (CP) type, and whether the number of REs for possible EPDCCH transmission is less than a threshold value.

8. The method of claim 7, wherein:

the type of the EPDCCH transmission includes the localized EPDCCH transmission and the distributed EPDCCH transmission;

the subframe type includes a normal subframe and a special subframe; and the cyclic prefix (CP) type includes a normal CP and an extended CP.

9. A method of configuring a downlink control channel located in a data region, in a user equipment (UE)-specific search space, in a transmission/reception point, the method comprising:

forming an enhanced physical downlink control channel (EPDCCH), wherein the forming the EPDCCH includes defining enhanced control channel elements (ECCEs) corresponding to a basic unit of an EPDCCH transmission in an EPDCCH UE-specific search space, by using a function of a radio network temporary identifier (RNTI) of user equipment, an index of the subframe, an aggregation level, and a total number of ECCEs of a corresponding EPDCCH set, and wherein (i) the EPDCCH includes a data region of one or more physical resource-block (PRB) pairs forming each of a plurality of EPDCCH sets in a subframe, (ii) each PRB pair includes a plurality of enhanced resource element groups (EREGs), and (iii) each of the ECCEs includes a plurality of EREGs; and transmitting the ECCEs defined in the EPDCCH UE-specific search space, through the EPDCCH to the user equipment, wherein in the case that each PRB pair includes an M number of EREGs, the ECCE includes an M/4 number of EREGs or an M/2 number of EREGs, wherein the M is a natural number.

10. The method of claim 9, wherein the M is 16.

11. The method of claim 9, wherein the defining the ECCEs includes:

defining the ECCEs such that the ECCEs are to be non-contiguous in a unit of the number of ECCEs corresponding to the aggregation level.

12. The method of claim 11, wherein an ECCE hopping value of the ECCEs defined to be non-contiguous is determined by a function of a total number of ECCEs of the corresponding EPDCCH set, the aggregation level, and the number of EPDCCH candidates monitored by the user equipment based on the aggregation level.

13. The method of claim 9, wherein:

in the case that the user equipment is configured with a carrier indicator field, a value of the carrier indicator field is applied to a function defining the ECCEs.

14. The method of claim 9, wherein each EPDCCH set is formed for one of a localized EPDCCH transmission and a distributed EPDCCH transmission.

15. The method of claim 14, wherein the aggregation level is determined based on at least one of a type of the EPDCCH transmission, a subframe type, a cyclic prefix (CP) type, and whether the number of REs for possible EPDCCH transmission is less than a threshold value.

16. The method of claim 15, wherein:

the type of the EPDCCH transmission includes the localized EPDCCH transmission and the distributed EPDCCH transmission;

the subframe type includes a normal subframe and a special subframe; and the cyclic prefix (CP) type includes a normal CP and an extended CP.

17. User equipment (UE) for receiving a downlink control channel located in a data region, the user equipment comprising:

a receiver configured to receive an enhanced physical downlink control channel (EPDCCH) from a transmission/reception point, wherein the EPDCCH includes a data region of one or more physical resource-block (PRB) pairs forming each of a plurality of EPDCCH sets in a subframe, and wherein (i) each PRB pair includes a plurality of enhanced resource element groups (EREGs), and (ii) an enhanced control channel element (ECCE) corresponding to a basic unit of an EPDCCH transmission includes a plurality of EREGs; and a control processor configured to decode the EPDCCH in a corresponding EPDCCH set according to a downlink control information (DCI) format in an EPDCCH UE-specific search space, wherein ECCEs monitored by the user equipment for the decoding of the EPDCCH is defined by a function of a radio network temporary identifier (RNTI) of the user equipment, an index of the subframe, an aggregation level, and a total number of ECCEs of the corresponding EPDCCH set, wherein in the case that each PRB pair includes an M number of EREGs, the ECCE includes an M/4 number of EREGs or an M/2 number of EREGs, wherein the M is a natural number.

18. A transmission/reception point for configuring a downlink control channel located in a data region, in an EPDCCH user equipment (UE)-specific search space, the transmission/reception point comprising:
- a control processor to configured to form an enhanced physical downlink control channel (EPDCCH), wherein the forming the EPDCCH includes defining enhanced control channel elements (ECCEs) corresponding to a basic unit of an EPDCCH transmission, in the EPDCCH UE-specific search space, by using a function of a radio network temporary identifier (RNTI) of user equipment, an index of the subframe, an aggregation level, and a total number of ECCEs of a corresponding EPDCCH set, and wherein (i) the EPDCCH includes a data region of one or more physical resource-block (PRB) pairs forming each of a plurality of EPDCCH sets in a subframe, (ii) each PRB pair includes a plurality of enhanced resource element groups (EREGs), and (iii) each of the ECCEs includes a plurality of EREGs; and
- a transmitter configured to transmit the ECCEs defined in the EPDCCH UE-specific search space, through the EPDCCH to the user equipment,
- wherein in the case that each PRB pair includes an M number of EREGs, the ECCE includes an M/4 number of EREGs or an M/2 number of EREGs, wherein the M is a natural number.

* * * * *